United States Patent
Taguchi et al.

[19]

[11] 4,198,146

[45] Apr. 15, 1980

[54] PHOTOGRAPHIC DATA PRINTING DEVICE

[75] Inventors: Tetsuya Taguchi, Kawasaki; Shuichi Tamura; Youichi Okuno, both of Yokohama, all of Japan

[73] Assignee: Canon Kabushiki Kaisha, Tokyo, Japan

[21] Appl. No.: 898,333

[22] Filed: Apr. 20, 1978

[30] Foreign Application Priority Data

Apr. 21, 1977 [JP] Japan .................................. 52-46132
Apr. 22, 1977 [JP] Japan .................................. 52-46522
Jul. 6, 1977 [JP] Japan .................................. 52-80583

[51] Int. Cl.² ...................... G03B 17/24; G03B 13/02
[52] U.S. Cl. ..................................... 354/106; 354/219
[58] Field of Search ............... 354/105, 106, 109, 219; 58/4A

[56] References Cited

U.S. PATENT DOCUMENTS

| | | | |
|---|---|---|---|
| 3,603,974 | 9/1971 | Copeland | 354/109 X |
| 3,839,856 | 10/1974 | Dargent | 58/4 A |
| 3,849,784 | 11/1974 | Holzapfel | 354/109 X |
| 3,882,512 | 5/1975 | Lawrence et al. | 354/109 |
| 3,889,281 | 6/1975 | Taguchi et al. | 354/105 X |
| 3,953,868 | 4/1976 | Kawamura et al. | 354/109 |
| 3,962,861 | 6/1976 | Protta et al. | 58/4 A X |
| 4,001,850 | 1/1977 | Fujita | 354/219 |

*Primary Examiner*—Donald A. Griffin
*Attorney, Agent, or Firm*—Toren, McGeady and Stanger

[57] ABSTRACT

A data printing device for use in a photographic camera includes an electronic clock for providing time and date data to be printed in digital form on the associated film in the camera. In one embodiment, the data are grouped into two parts which are printed in time-displaced relation to each other on a common picture frame, while the data are prevented from changing during the printing operation, as time passes on. The display of data is effected only when printing is performed, or when required or desired values of time and/or date are set in the electronic clock, thereby the consumption of electrical energy of a common battery of the exposure control apparatus in the camera is minimized.

21 Claims, 26 Drawing Figures

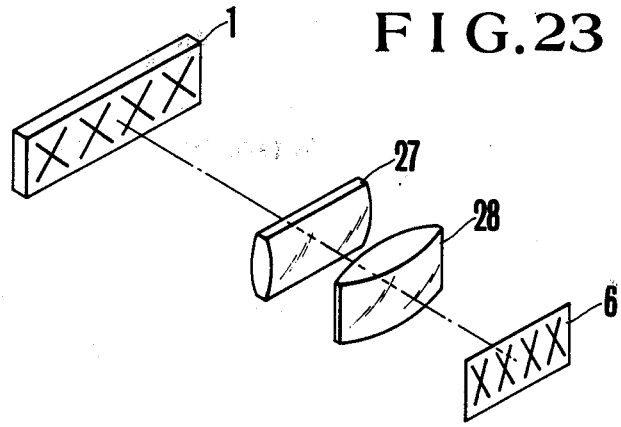
FIG.23
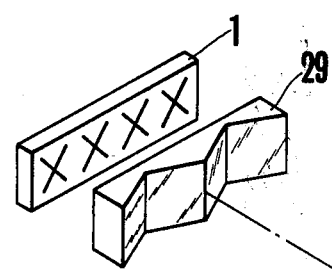
FIG.24a
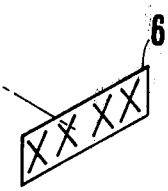
FIG.24b
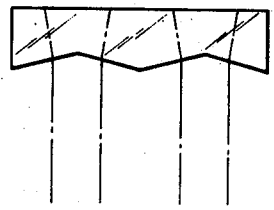

PHOTOGRAPHIC DATA PRINTING DEVICE

BACKGROUND OF THE INVENTION

This invention relates to a printing device for printing photographic data on a film in a camera. There is known a printing device having manually operable dials for day, month and year on the camera housing. In this type of printing device, however, as the data is set by manually operating the dial, there is a danger that the data setting is forgotten or erroneous data is set. To avoid the recording of erroneous data caused by data setting error, it is possible to print the data by using the display of time on a digital clock. However, the disadvantage which is encountered when the conventional type of digital clock is used with the printing device is that at least six digit readout members are necessary at a time of printing for day, month and year, thereby it being made difficult to incorporate such printing device in a camera of reduced size.

Accordingly, the display value of the digital clock is changing every second by counting the pulse with the frequency of 1 Hz. Naturally, the display value is changing even at the time of data printing. Therefore, the conventional device has been confronted with a danger that the data is double-exposed because the display value changes at the time of data printing. Accordingly the intensity of illumination of display of clock is constant, even at the time of data printing. On the other hand, the film speed value is depend on the film used at the photography. Therefore, it is necessary to change the intensity of illumination depend on the film speed at the time of data printing.

Accordingly, an object of the present invention is to provide a photographic data printing device which has overcome the above-mentioned drawbacks of the conventional printing device.

Another object of the present invention is to provide a data printing device using the digital clock, which holds the display value at the time of data printing to avoid the changing of the display value.

Still another object of the present invention is to provide a data printing device using the digital clock as the printing data device, which changes the intensity of illumination depend of the film speed value at the time of data printing to make the proper exposure.

Further object is to provide a printing device having a digital clock capable of displaying a time in second, minute and hour and a date in day, month and year simultaneously, while nevertheless being suited for use in a camera of reduced size.

A further object is to provide a printing device which produces a display of data only when the data are printed or monitored, thereby the consumption of electrical energy of a common battery of an exposure control apparatus is minimized.

A further object is to provide a printing device which enables data two or more times as much as the number of digit indicators used to be recorded in a single picture frame.

A furthermore object is to provide a printing device having a digital clock with setting means accessible from the outside of the camera housing in which the device is mounted to set desired values of data.

These and other objects, features and advantages of the invention will become apparent from the following detailed description of the preferred embodiments thereof taken in conjunction with the accompanying drawings in which:

BRIEF EXPLANATION OF THE DRAWINGS

FIGS. 8 to 11 are similar electrical circuit diagrams to those of FIGS. 6, 7, 5 and 4 respectively.

FIGS. 23 and 24 (*a* and *b*) are fragmentary perspective views of optical elements for altering the size and spacing of the digits constituting the data to be printed.

DESCRIPTION OF THE PREFERRED EMBODIMENTS

Figure 1:
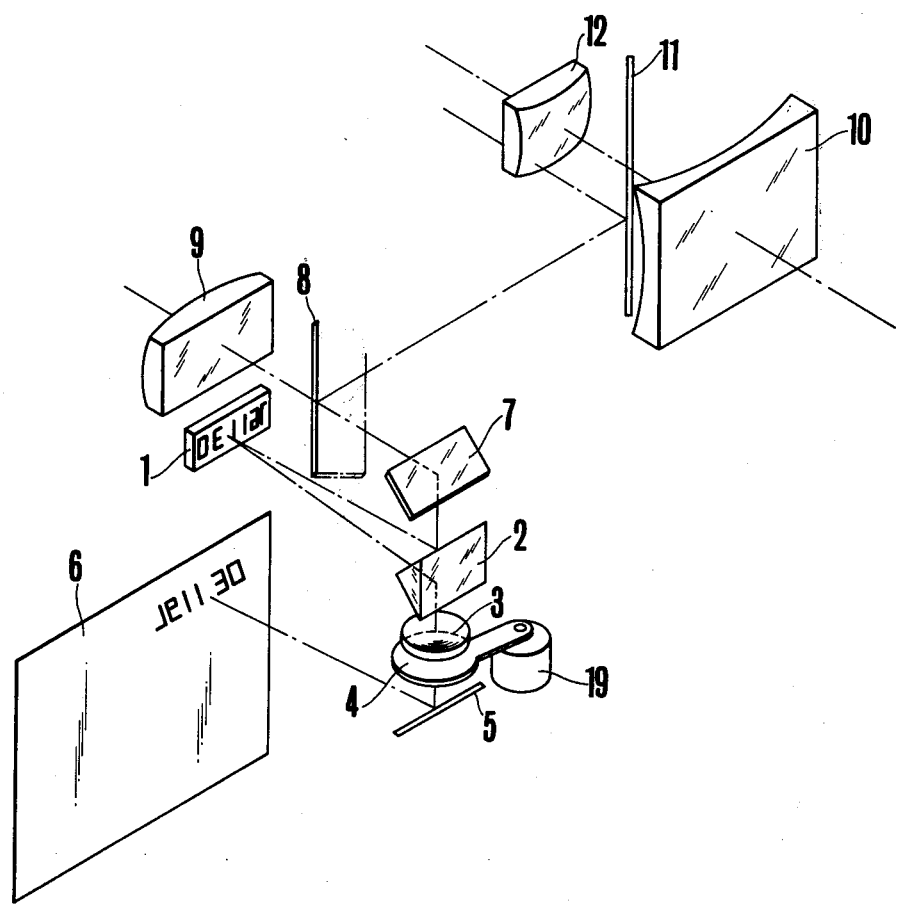
FIG. 1 is an exploded perspective view of the various optical parts of one embodiment of a printing device according to the present invention and the associated parts of a camera finder.

In FIG. 1, there is shown a digital display 1 (display plate of digital clock) with six digit indicators each comprising seven segments of light-emitting diodes in figure eight pattern. These indicators are laterally aligned on a common axis parallel to the path of transportation of a film 6 in the camera. Light from the display 1 is splitted by a prism 2 into two beams, one of which is directed downwardly to a lens for focusing an image of the displayed data 1 onto a film frame at a corner of the area thereof after reflection from a mirror 5 when a shutter 4 is taken out of the light path by the action of an electro-magnetic drive 19. The other beam is directed upward to a mirror 7 and therefrom reflected to a half-mirror 8. That fraction of the beam which passes through the half-mirror 8 reaches an eye of an observer looking through an enlarger lens 9 mounted in a window in the wall of the back cover of the camera housing (see FIG. 25). The remaining fraction of the beam which is reflected by the half-mirror 8 after further reflection of another half-mirror 11 enters an optical system of the camera finder which includes a plano-concave lens 10 and a plano-convex lens or eye-piece 12 as the half-mirror 11 is positioned in a space between the lenses 10 and 12 to make an angle of 45° with the optical axis of the lenses 10 and 12.

Figure 2:
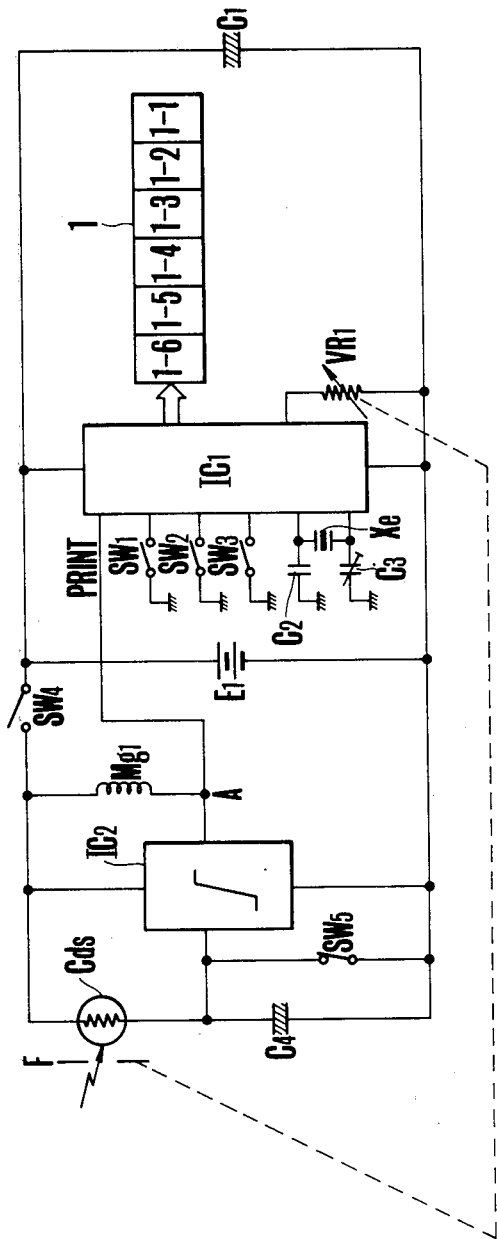
FIG. 2 shows an example of arrangement of the circuitry of the device of FIG. 1 cooperating with an exposure control circuit in the camera.

In FIG. 2, the circuitry of the printing device of the invention is shown with power supply from a common battery E1 of a shutter time control circuit. The battery E1 charges a capacitor C1 which is connected across an integrated circuit IC1 for an electronic clock of CMOS structure so that when the battery E1 is replaced by new one, the operation of the electronic clock IC1 is not interrupted as the necessary power supply is assured from the capacitor C1. Instead of using the capacitor C1, it is possible to use a battery of small capacity.

As the electronic clock IC1 starts to operate with a clock pulse train from a quartz oscillator Xe of which the frequency is adjusted to 32,768 Hz by the combination of a fixed capacitor C2 and a variable capacitor C3 and when a first switch SW1 is closed, the indicators 1-1 and 1-2 for the least and next significant digits are operated to display a number in "time" second. This number is increased by one for every one second. At a time point during the process of counting the number of clock pulses when a standard clock strikes "0" second, the operator will depress a button not shown to close a second switch SW2, thereby the electronic clock CI1 of second counter (after mentioned) is reset. Thus, the electronic clock IC1 is corrected for the second unit. The closure of SW2 further causes display of a number by the most significant digit 1-6 and the digit standing just to the right thereof in hour unit. This number is increased by one for every 2 Hz duration of closure of SW2. At a point in time during the process of displaying ever-changing numbers in hour unit when the displayed number coincides with that of the standard clock, the operator may open the switch SW2 to set the correct value of hour in the electronic clock IC1 of hour counter. At the same time, the energization of the digit indicators 1-5 and 1-6 is terminated. To set the correct value of minute, the operator first closes the first switch SW1 to energize the digit indicators 1-3 and 1-4, then closes the second switch SW2 to start change of the displayed number in minute at a speed of 2 Hz, and then opens the second switch SW2 when the displayed number coincides with the number of minutes in the standard clock. To set the date in the electronic clock IC1, the operator will first close a third switch SW3, and then perform a procedure similar to the above. After the setting of the correct time and date has been completed, the operator closes the set control switch SW1 to terminate the duration of display of the time and date. If the operator is desired to recognize whether or not the final setting result is correct, he or she may close the "READ" switch SW2. With the date-time selector switch SW3 closed, the displayed number is a date in year, month and day. When SW3 is opened, the displayed number is a time in hour, minute and second.

When a release button on the camera housing is depressed, a main switch SW4 is closed to start operation of the shutter control circuit. When the shutter is opened with simultaneous occurrence of opening of a switch SW5 connected across a timing capacitor C4, the capacitor C4 is charged through a light sensitive element CdS. Responsive to the output of the timing circuit CdS and C4, a switching circuit IC2 is an integrated form produces an actuating signal for a magnetic winding Mg1 controlling closing operation of the shutter. This actuating signal also serves as a printer command signal. To regulate the intensity of luminance of the display 1 in accordance with the sensitivity of the film used, there is provided a variable resistor VR1 in combination with a diaphragm F which is positioned in front of the light sensitive element CdS and said CdS, C4, IC2, Mg1, SW5 make the exposure control circuit.

Figure 3:
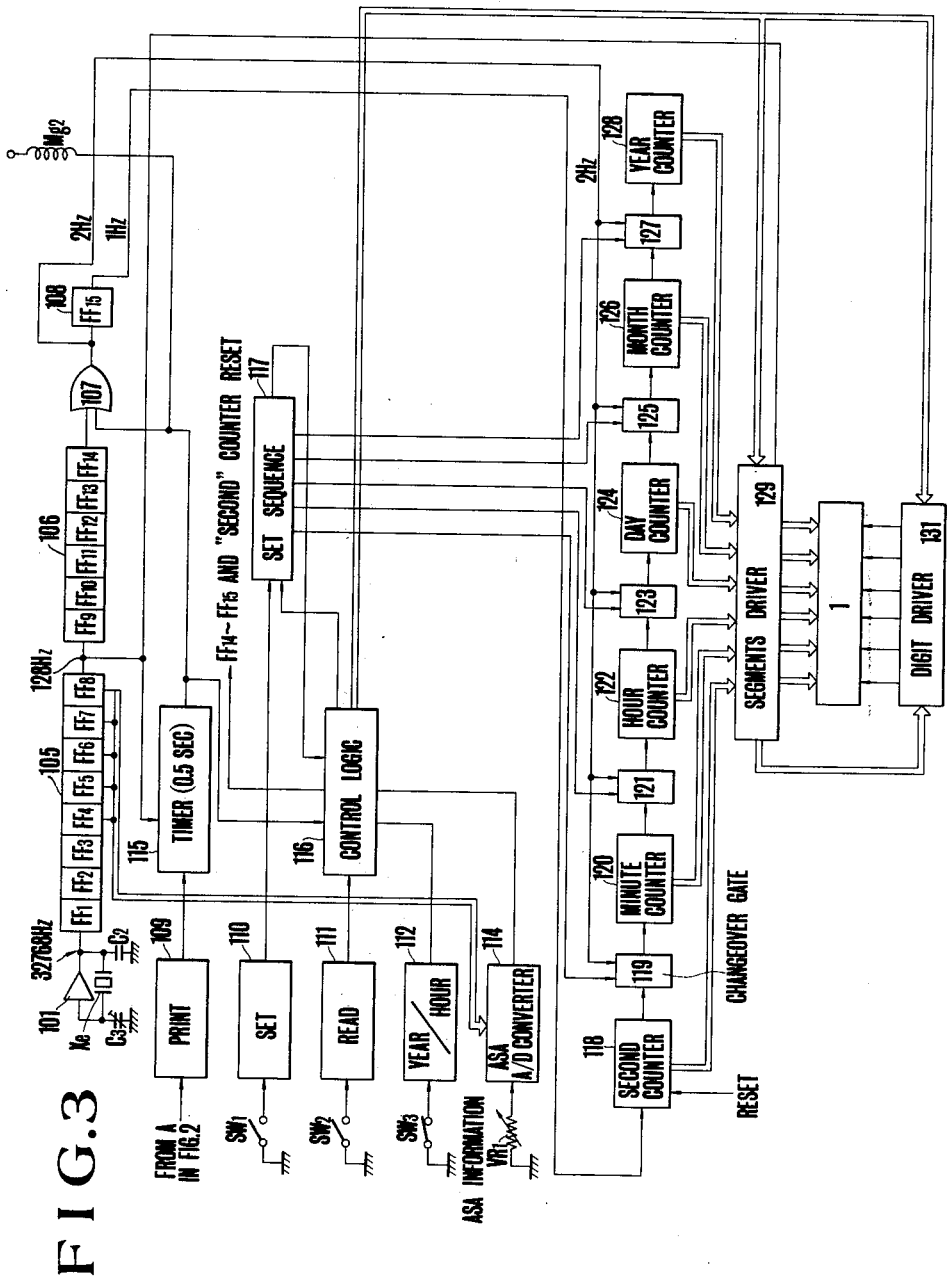
FIG. 3 is a block diagram showing the various circuit components of the printing device of FIGS. 1 and 2.

FIG. 3 shows the various circuit components of electrical clock IC1 of the invention. The quartz oscillator Xe is connected between an input and output of an operational amplifier 101 to produce a clock pulse train at a frequency of 32,768 Hz which is applied to a binary counter 105 of eight flip-flops FF1 to FF8. The eighth flip-flop FF8 produces a pulse train at a frequency of 128 Hz which is further divided by a second binary counter 106 of six flip-flops FF9 to FF14 to 2 Hz. The output of the sixth flip-flop FF14 is applied through an OR gate 107 to a flip-flop FF15 which produces a pulse train at a frequency of 1 Hz.

Responsive to the printer command signal, a one-shot 109 produces a pulse which is applied to a timer 115 to produce a pulse of duration of 0.5 seconds for which the display 1 is energized. When the first switch SW1 is closed, a one-shot 110 produces a pulse of short duration which is applied to a set sequence control circuit 117. When the second switch SW2 is closed, a read circuit such as an inverter 111 produces an output of binary "1" level, which is applied to a logic circuit 116. When the third switch SW3 is opened and closed, a circuit 112 produces respective signals. An A/D converter 114 produces a pulse train with a duty ratio dependent upon the sensitivity of the used film set in the variable resistor VR1.

The pulse train of 1 Hz frequency is applied to a "second" counter 118 of 60-scale. The output of counter 118 is applied through a set change-over gate 119 to a "minute" counter 120 of 60-scale. The output of counter 120 is applied through a set change-over gate 121 to a "hour" counter 122 of 24-scale. The output of counter 122 is applied through a set change-over gate 123 to a "day" counter 124 of 28- to 31-scale. The output of counter 124 is applied through a set change-over gate 125 to a "month" counter 126 of 12-scale. The output of counter 126 is applied through a set change-over gate 127 to a "year" counter 128 of 10-scale plus 10-scale. The counters 118, 120, 122, 124, 126, 128 make the counter circuit. The contents of the counters 118, 120, 122, 124, 126 and 128 are decoded by a segment driver 129 to control operation of the digit indicators 1. 131 is a digit driver of the display 1 and said counter circuit and 105, 106, 117 make the switch circuit.

The operation of the circuit of FIG. 3 is as follows. The quartz oscillator Xe oscillates at a frequency of 32,768 Hz which is divided by the frequency divider 105 to produce an output signal of 128 Hz. This signal is fed not only to the timer 115 but to the segment driver 129. The signal of 128 Hz is further divided by the six-stage frequency divider 106 to produce a signal of 2 Hz. This signal is applied to each of the set changeover gates 119, 121, 123, 125 and 127 and therefrom transmitted to each of the counters 120, 122, 124, 126 and 128 except for "second" counter 118, as the gates are selectively opened and closed by the outputs of the set sequence control circuit 117, when each of the required values of minute, hour, day, month and year is set respectively.

If the operator desires to see what time and date are set in the electronic clock, he needs to close READ switch SW2, while the DATE/TIME selector switch SW3 is opened and closed respectively, so that the contents of the counters 118, 120 and 122 and the contents of the counters 124, 126 and 128 are displayed in a selective manner. This display can be viewed in the field of view of the finder or through the window 9 of FIG. 1.

At the time of completion of an exposure, the printing command signal is transmitted to the one-shot 109, causing the timer 115 to produce a pulse having a width of 0.5 second. This pulse is fed not only to the control logic circuit 116 but to the OR gate 107. Therefore, the contents of the counters 118 to 128 are maintained unchanged for that time interval of 0.5 second, despite of the fact that the output of the flip-flop FF14 changes from binary "1" to "0" level. As a result, the printing operation proceeds with the fixed values of time and date. An electro-magnetic winding Mg2 is energized by the output of the timer 115 to take the shutter 4 out of the light path so that the film 6 is exposed to a light beam bearing the data displayed at 1, while the intensity of the light beam is adjusted in accordance with the sensitivity of the film use 6, since the film speed information set in the variable resistor VR1 is converted by the A/D converter 114 to a duty ratio for a pulse train which is fed to the control logic circuit 116 and therefrom directed to the segment driver 129.

When a required value of time is to be set, the operator will first close SET switch SW1, causing the one-shot 110 to produce a signal. Responsive to this signal, the set sequence control circuit 117 makes only the "second" counter 118 ready for setting at zero. Next, when READ switch SW2 is closed to change the displayed value of second to zero, a "hour" set signal is transmitted to the set sequence control circuit 117. If the operator does not desire to reset "second" counter 118 to "0" condition, he may close SET switch SW1 at the second time, so that "hour" counter 122 is made ready for setting of a required value of hour. With SET switch SW1 closed at the second time, when READ switch SW2 is closed, a pulse train of 2 Hz frequency from the OR gate 107 is passed through the gate 121 to "hour" counter 122, thereby the number displayed at 1 is increased by two for every one second. Therefore, the operator must open READ switch SW2 when the displayed number coincides with the required value of hour. With SET switch SW1 closed at the third time, "minute" counter 120 is made ready for setting of a required value of minute. The subsequent closure of READ switch SW2 continues until the ever-varying numbers displayed at 1 reaches the required value of minute. When SET switch SW1 is closed at the fourth time, "month" counter 126 is made ready for setting of a required value of month regardless of whether TIME/DATE selector switch SW3 is opened or closed. The subsequent procedure will proceed in a manner similar to the above. After all the counters 118 to 128 have been set, when SW1 is closed again, the counting of pulses at 1 Hz frequency from FF15 starts.

Figure 4:
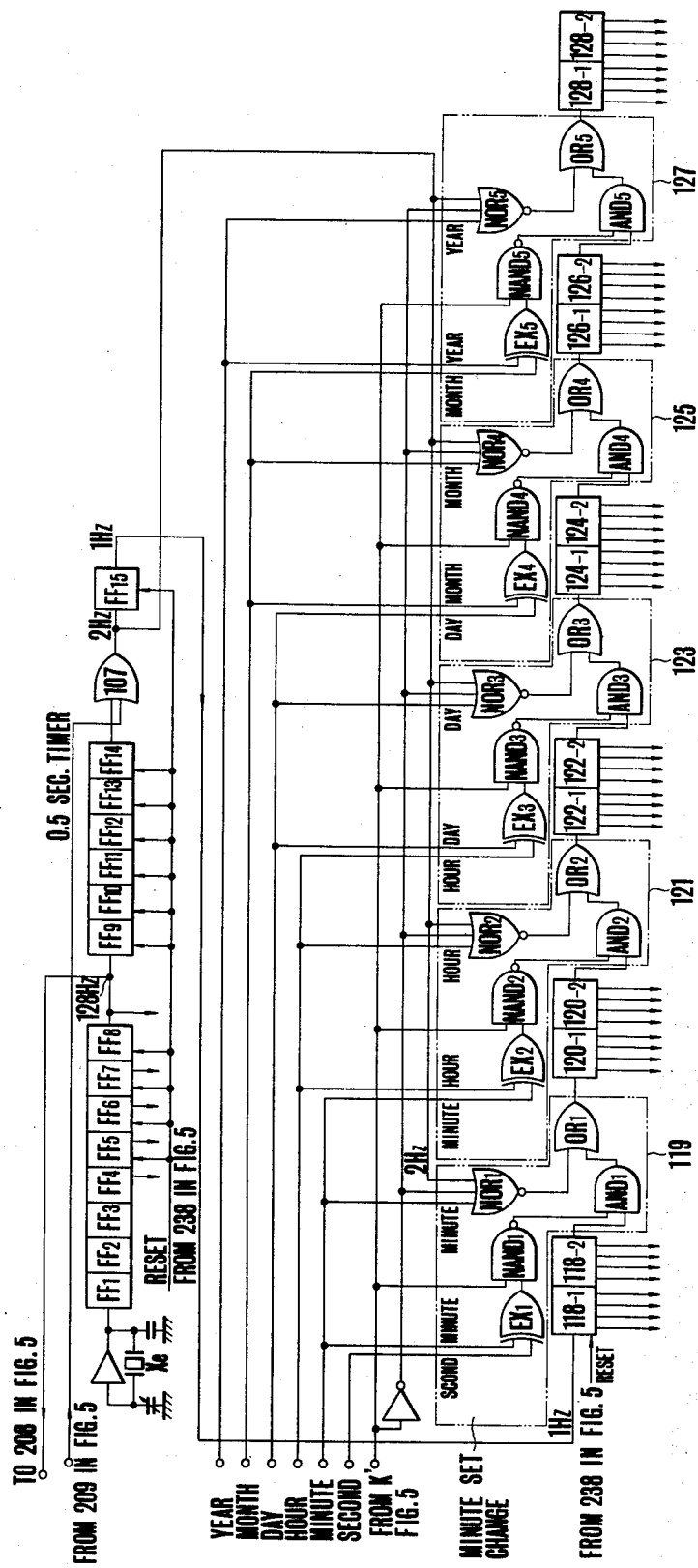
FIGS. 4 to 7 are schematic electrical circuit diagrams showing the details of the components of FIG. 3, with FIG. 4 showing the electronic clock and the control circuit therefor, with FIG. 5 showing the display control circuit, with FIG. 6 showing the drive control circuit for the digit indicators, and with FIG. 7 showing the control circuit for selective operation of the indicators.

In FIG. 4, the "second" counter 118 of FIG. 3 is shown consisting of a counter 118-1 of decimal type and a counter 118-2 of divide-by "6" type to function as a counter of divide-by "60" type. The "minute" counter 120 consists of a counter 120-1 of decimal type and a counter 120-2 of divide-by "6" type and functions as a counter of divide-by "60" type. The "hour" counter 122 consists of a counter 122-1 of decimal type and a counter 122-2 of 3-scale and functions as a counter of divide-by "24" type. The "day" counter 124 consists of a counter 124-1 of decimal type and a counter 124-2 of divide-by "4" type and functions as a counter of divide-by "28 to 31" type. The "month" counter 126 consists of a counter 126-1 of decimal type and a counter 126-2 of divide-by "2" type and functions as a counter of divide-by "12" type. The "year" counter 128 consists of a counter 128-1 of decimal type and a counter 128-2 of decimal type and functions as a counter of divide-by "100" type.

The gating circuits 119, 121, 123, 125 and 127 of FIG. 3 each comprise an exclusive OR gate, a NAND gate, an AND gate, a NOR gate and an OR gate connected to one another so that during the normal counting operation the signal of 1 Hz from FF15 controls operation of "second" counter 118, the output of "second" counter 118 controls operation of "minute" counter 120, and so on. When setting is performed, the first time closure of SET switch SW1 causes production of only one "0" signal from the set sequence control circuit 117 at an output stage adapted for setting "second" counter 118, as will be seen from the following Table 1.

Table 1

| Set Step | Set Sequence | | | | | |
|---|---|---|---|---|---|---|
| | Second | Minute | Hour | Day | Month | Year |
| 0 | 1 | 1 | 1 | 1 | 1 | 1 |
| 1 | 0 | 1 | 1 | 1 | 1 | 1 |
| 2 | 1 | 1 | 0 | 1 | 1 | 1 |
| 3 | 1 | 0 | 1 | 1 | 1 | 1 |
| 4 | 1 | 1 | 1 | 1 | 0 | 1 |
| 5 | 1 | 1 | 1 | 0 | 1 | 1 |
| 6 | 1 | 1 | 1 | 1 | 1 | 0 |
| 7 | 1 | 1 | 1 | 1 | 1 | 1 |

Responsive to these signals from the set sequence control circuit 117, the various components of the gating circuits 119 to 127 operate as follows.

Table 2

| Set | Read SW2 | Ex 1 | NAND 1 | AND 1 | NOR 1 | OR 1 | Ex 2 | NAND 2 | AND 2 | NOR 2 | OR 2 | Ex 3 | NAND 3 | AND 3 | NOR 3 | OR 3 |
|---|---|---|---|---|---|---|---|---|---|---|---|---|---|---|---|---|
| 0 | OFF | 0 | 1 | x | 0 | sec. | 0 | 1 | x | 0 | min. | 0 | 1 | x | 0 | hr. |
|  | ON | 0 | 1 | x | 0 | " | 0 | 1 | x | 0 | " | 0 | 1 | x | 0 | " |
| 1 sec. | OFF | 1 | 1 | x | 0 | " | 0 | 1 | x | 0 | " | 0 | 1 | x | 0 | " |
|  | ON | 1 | 0 | 0 | 0 | 0 | 0 | 1 | x | 0 | " | 0 | 1 | x | 0 | " |
| 2 hr. | OFF | 0 | 1 | x | 0 | sec. | 1 | 1 | x | 0 | " | 1 | 1 | x | 0 | " |
|  | ON | 0 | 1 | x | 0 | " | 1 | 0 | 0 | 2Hz | 2Hz | 1 | 0 | 0 | 0 | 0 |

Table 2-continued

| | | | | | | | | | | | | | | | | | |
|---|---|---|---|---|---|---|---|---|---|---|---|---|---|---|---|---|---|
| 3 min. | OFF | 1 | 1 | x | 0 | " | 1 | 1 | x | 0 | min. | 0 | 1 | x | 0 | hr. |
| | ON | 1 | 0 | 0 | 2Hz | 2Hz | 1 | 0 | 0 | 0 | 0 | 0 | 1 | x | 0 | " |
| 4 m. | OFF | 0 | 1 | x | 0 | sec. | 0 | 1 | x | 0 | min. | 0 | 1 | x | 0 | " |
| | ON | 0 | 1 | x | 0 | " | 0 | 1 | x | 0 | 0 | 0 | 1 | x | 0 | " |
| 5 d. | OFF | 0 | 1 | x | 0 | " | 0 | 1 | x | 0 | " | 1 | 1 | x | 0 | " |
| | ON | 0 | 1 | x | 0 | " | 0 | 1 | x | 0 | " | 1 | 0 | 0 | 2Hz | 2Hz |
| 6 yr. | OFF | 0 | 1 | x | 0 | " | 0 | 1 | x | 0 | " | 0 | 1 | x | 0 | hr. |
| | ON | 0 | 1 | x | 0 | " | 0 | 1 | x | 0 | " | 0 | 1 | x | 0 | " |
| Set | Read SW2 | Ex 4 | NAND 4 | AND 4 | NOR 4 | OR 4 | Ex 5 | NAND 5 | AND 5 | NOR 5 | OR 5 | | | | | |
| 0 | OFF | 0 | 1 | x | 0 | d. | 0 | 1 | x | 0 | m. | | | | | |
| | ON | 0 | 1 | x | 0 | " | 0 | 1 | x | 0 | " | | | | | |
| 1 sec. | OFF | 0 | 1 | x | 0 | " | 0 | 1 | x | 0 | " | | | | | |
| | ON | 0 | 1 | x | 0 | " | 0 | 1 | x | 0 | " | | | | | |
| 2 hr. | OFF | 0 | 1 | x | 0 | " | 0 | 1 | x | 0 | " | | | | | |
| | ON | 0 | 1 | x | 0 | " | 0 | 1 | x | 0 | " | | | | | |
| 3 min. | OFF | 0 | 1 | x | 0 | " | 0 | 1 | x | 0 | " | | | | | |
| | ON | 0 | 1 | x | 0 | " | 0 | 1 | x | 0 | " | | | | | |
| 4 m. | OFF | 1 | 1 | x | 0 | " | 1 | 1 | x | 0 | " | | | | | |
| | ON | 1 | 0 | 0 | 2Hz | 2Hz | 1 | 0 | 0 | 0 | 0 | | | | | |
| 5 d. | OFF | 1 | 1 | x | 0 | d. | 0 | 1 | x | 0 | m. | | | | | |
| | ON | 1 | 0 | 0 | 0 | 0 | 0 | 1 | x | 0 | " | | | | | |
| 6 yr. | OFF | 0 | 1 | x | 0 | d. | 1 | 1 | x | 0 | " | | | | | |
| | ON | 0 | 1 | x | 0 | " | 1 | 0 | 0 | 2Hz | 2Hz | | | | | |

Figure 5:
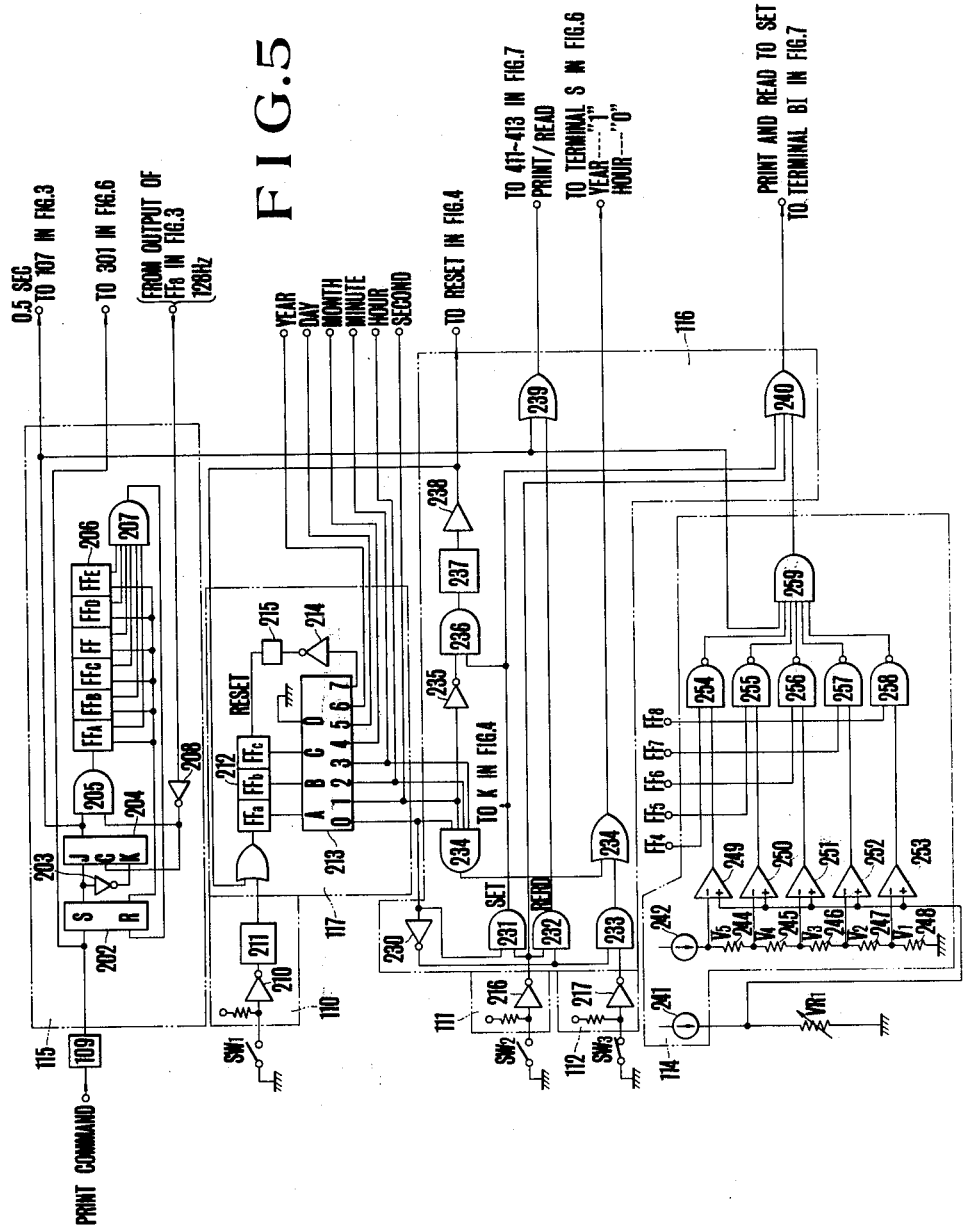

FIG. 5 shows the details of the A/D converter 114 for film speed information, timer 115, control logic circuit 116 and set sequence control circuit 117, each of which will be explained below.

The A/D converter 114 comprises two constant current sources 241 and 242, the former being connected to the aforesaid variable resistor VR1, a voltage divider of five fixed resistors 244 to 248 connected in series to each other and to the second constant current source 242, five comparators 249 to 253 having negative inputs connected to the respective taps V5 to V1 to the voltage divider and having positive inputs connected through a common lead to the output of the first constant current source 241, five NAND gates 254 to 258 having one inputs connected to the respective outputs of the comparators 249 to 253, the other inputs being connected to the outputs of the flip-flops FF4 to FF8 respectively, and an AND gate 259 having inputs connected to the respective outputs of NAND gates 254 to 258 and an additional input connected to one of the outputs of the timer 115.

Now assuming that the sensitivity of the film used is ASA 25, then the output voltage of the variable resistor VR1 is smaller than that appearing at V1 so that all the outputs of the comparators 249 to 253 produces outputs of "0" level, causing the AND gate 259 to produce a pulse of 0.5 sec. duration as the timer 115 produces a pulse of 0.5 sec. duration at the time when the printer command signal is fed from the shutter control circuit to the timer 115 through the one-shot 109. In the case of ASA 50, the output voltage of the variable resistor VR1 becomes higher than that appearing at V1 but lower than that appearing at V2, so that, whilst the first four comparators 249 to 252 remain unchanged in the output level, the last comparator 253 is caused to produce an output of "1" level, thereby the NAND 258 is gated on to pass a pulse train from FF8 stage of the frequency divider 105 of FIG. 3 to the AND gate 259. As a result, the output of A/D converter 114 is halved because the duty is 50% as high as when ASA 25. Suppose the duty is 100% when in ASA 25, the duties for ASA 50, 100, 200 and 400 are 50%, 25%, 12.5% and 6.25% respectively.

The timer 115 comprises an S-R flip-flop 202 having a "set" input connected to the output of the one-shot 109, a J-K flip-flop 204 with J input connected to the output of S-R flip-flop 202, with K input connected through an inverter 203 to the J input, and with C input connected through an inverter 208 to the frequency divider 105 at FF8, a 6-bit counter 206 of flip-flops FFA to FFF having an input connected through an AND gate 205 to the output of the J-K flip-flop 204, and an AND gate 207 having inputs connected to the respective outputs of the flip-flops FF$_A$ to FF$_F$ and having an output connected to the R input of the S-R flip-flop 202. Before the printing command signal is transmitted to the one-shot 109, the output of the S-R flip-flop 202 becomes of "0" level, and the output of the J-K flip-flop 204 also becomes of "0" level, thus the 0.5 sec. printing control signal becomes of "0" level.

At the time when the magnetic winding Mg1 of FIG. 2 is actuated for energization, the printing command signal is applied to the one-shot 109 and is stored in the S-R flip-flop 202 with the output changed to "1" level. Responsive to the tailing edge of the one of the pulses of 128 Hz frequency which occurs when the output of S-R flip-flop 202 changes to "1" level, the J-K flip-flop 204 starts to produce an output of "1" level. As the pulse train of 128 Hz frequency is fed to the first AND gate 205 through the inverter 208, the 6-bit counter 206 starts to count the pulses at the time of the tailing edge of the next pulse. When the number of pulses counted by the counter 206 has reached sixty-three, the output of the AND gate 207 changes to "1" level causing the S-R flip-flop 202 to be reset to "0" condition and then causing the J-K flip-flop 204 to be reset to "0" condition. In other words, the output of the J-K flip-flop 204 remains unchanged from "1" level during a time interval in which 64 pulses have been counted, that is, 64/128=0.5 (sec.).

The set sequence control circuit 117 comprises a 3-bit counter 212 having an input connected to the output of a one-shot 211 through an OR gate, the one-shot 211 constituting the set signal forming circuit 110 together with an inverter 210 and the SET switch SW1, a BCD-to-Decimal decoder 213 having four inputs A to D, the first four of which are connected to the respective outputs of the flip-flops FFa, FFb and FFc of the counter 212, and the other of which is grounded, and having ten output stages including ones designated by 0, 1 to 6 for the normal clock operation, and "second," "hour," "minute," "month," "day" and "year" setting operations respectively, and a one-shot 215 having an input connected through an inverter 214 to the output stage 7 of the BCD-to-Decimal decoder 213.

The logic circuit 116 comprises first and second AND gates 231 and 232 having one input connected to the output of the READ signal forming circuit 111 a third AND gate 233 having one input connected to the output of the TIME/DATE selector 112, the other inputs of the AND gates 232, 233 being connected through a common inverter 230 to the output stage 0 of the BCD-to-Decimal decoder 213, while the other input of the AND gate 231 being connected directly to the output stage 0, a fourth AND gate 234 having four inputs connected to the respective output stages 0, 1, 2 and 3 of the BCD-to-Decimal decoder 213 and having an output connected to one of the two inputs of an OR gate 234', the other input of the OR gate 234' being connected to the output of the AND gate 233, a fifth AND gate 236 having two inputs, one of which is connected through an inverter 235 to the output stage 1 of the BCD-to-Decimal decoder 213, and the other of which is connected to the output of the AND gate 231, and a one-shot 237 having an input connected to the output of the AND gate 236 and having an output connected through an inverter 238 to the "reset" terminals of the frequency dividers 105 and 106 of FIG. 3 and also to the other input of the OR gate in block 117 of FIG. 5.

The operation of the circuit components of FIGS. 4 and 5 will be explained by reference to Tables 1 and 2. When in the normal operation, the counter 212 in the set sequence control circuit 117 is left set in "0" condition, and therefore only one of the output stages of the BCD-to-Decimal decoder 213, namely, that designated by 0, takes "0" condition, while the other output stages are set in "1" condition. Accordingly, "1" signals appear at all the terminals designated by "second," "minute," "hour," "day," "month" and "year," and are directed to the exclusive OR gates 1 to 5 and NOR gates 1 to 5 of FIG. 4, so that all the counters 118 to 128 are connected in series to each other through the gated-on AND gates 1 to 5 and OR gates 1 to 5 as will be seen from the first lines of Tables 1 and 2. Thus, "second" counter 118 receptive of a pulse train having a frequency of 1 Hz from the flip-flop FF15 produces one pulse for every one minutes, "minute" counter 120 receptive of pulses from "second" counter 118 produces one pulse for every one hour, and so on.

If the operator is desired to see what time and date are set in the counters 118 to 128 at a given time, he or she will close READ switch SW2. So long as READ switch SW2 is closed, an inverter 216 in block 111 continues to produce a "1" output signal which is passed through the gated-on AND gate 232 and through OR gate 239 to the digit driver 131 of FIG. 7. The "1" output signal of the inverter 216 also is directed through an OR gate 240 in block 116 to the segment decoder/driver 129 of FIGS. 3 and 7, thereby the value of either one of time and date is displayed by the common indicators 1-1 to 1-6 of FIG. 7, depending upon whether or not TIME/DATE selector switch SW3 is open, since the opening of TIME/DATE selector switch SW3 causes an inverter 217 to produce "0" signal which is passed through AND gate 233 and OR gate 234' to appear at the terminal S of FIG. 6. The display can be viewed through the optical system of FIG. 1. If it happens that the displayed time and date differ from the required values, the operator need to perform the following operation after the switch SW2 is opened.

When SET switch SW1 is closed at the first time, the one-shot 211 produces a pulse of short duration which is counted by the 3-bit counter 212. Responsive to the output of counter 212, the BCD-to-Decimal decoder 213 shifts the output stage for production of "0" signal from "0" stage to "1" stage. This corresponds to 1st set step in Table 1 and controls the operation of the gating circuits 119 to 127 in a manner as shown on the third line in Table 2. At a point in time any suitable standard clock strikes just zero second time, the operator may close READ switch SW2, causing the AND gate 231 to produce "1" signal which is applied to the AND gate 236 and therefore causing the AND gate 236 to produce "1" signal which triggers the one-shot 237. The "reset" signal from the one-shot 237 is applied through the buffer amplifier 238 to the "second" counter 118 and also to flip-flops FF3 to FF15. The output of the buffer amplifier 238 is also applied to the input of the counter 212 with the result that the position of the output stage for production of "0" signal is further shifted one to the right, that is, at 2 stage. This situation corresponds to 2nd set step in Table 1. The conditions of the various components of the changeover gating circuits 119 to 127 are shown on the fourth line in Table 2. When the switch SW2 is opened and then closed again, a pulse train of 2 Hz is transmitted through the OR gate OR2 of FIG. 4 to the "hour" counter 122. At a point in time the ever-increasing numbers of the counter 122 coincide with the required value of hour, the operator may open SW2 to stop counting operation of 2 Hz pulse train by the counter 122.

When SET switch SW1 is closed at the second time, the condition of the output stage 3 of the BCD-to-Decimal decoder 213 becomes "0" as shown on the fourth line in Table 1. Upon closure of READ switch SW2, the displayed number starts to change at a speed of 2 Hz. When the required value of minute is attained, the switch SW2 is opened to stop counting operation of 2 Hz pulse train. With SET switch SW1 closed at the third, fourth or fifth time, the required value of month, day or year can be set in a similar manner to the above. When SET switch is closed at the sixth time, only the output stage 7 of the BCD-to-Decimal decoder 213 produces "0" signal which after being inverted to "1" signal is applied to the one-shot 215 for producing a pulse of short duration. This pulse functions as a reset signal for the counter 212.

In case of a data printing mode, after an exposure is completed, the printing command signal is transmitted to the one-shot 109. The pulse from the one-shot 109 actuates the timer 115 to maintain the flip-flop 204 at "1" level for 0.5 seconds which is applied to the OR gate 107 of FIG. 3, thereby the contents of the counters 118 to 128 are maintained unchanged for 0.5 seconds. At this time, the OR gate 239 produces "1" signal which continues for 0.5 seconds, and the OR gate 240 also produces "1" signal with a duty ratio dependent upon the sensitivity of the used film. Again, during 0.5 seconds, the electromagnet Mg2 is energized by the output of the timer 115 so that the data is printed on the film 6.

Figure 6:
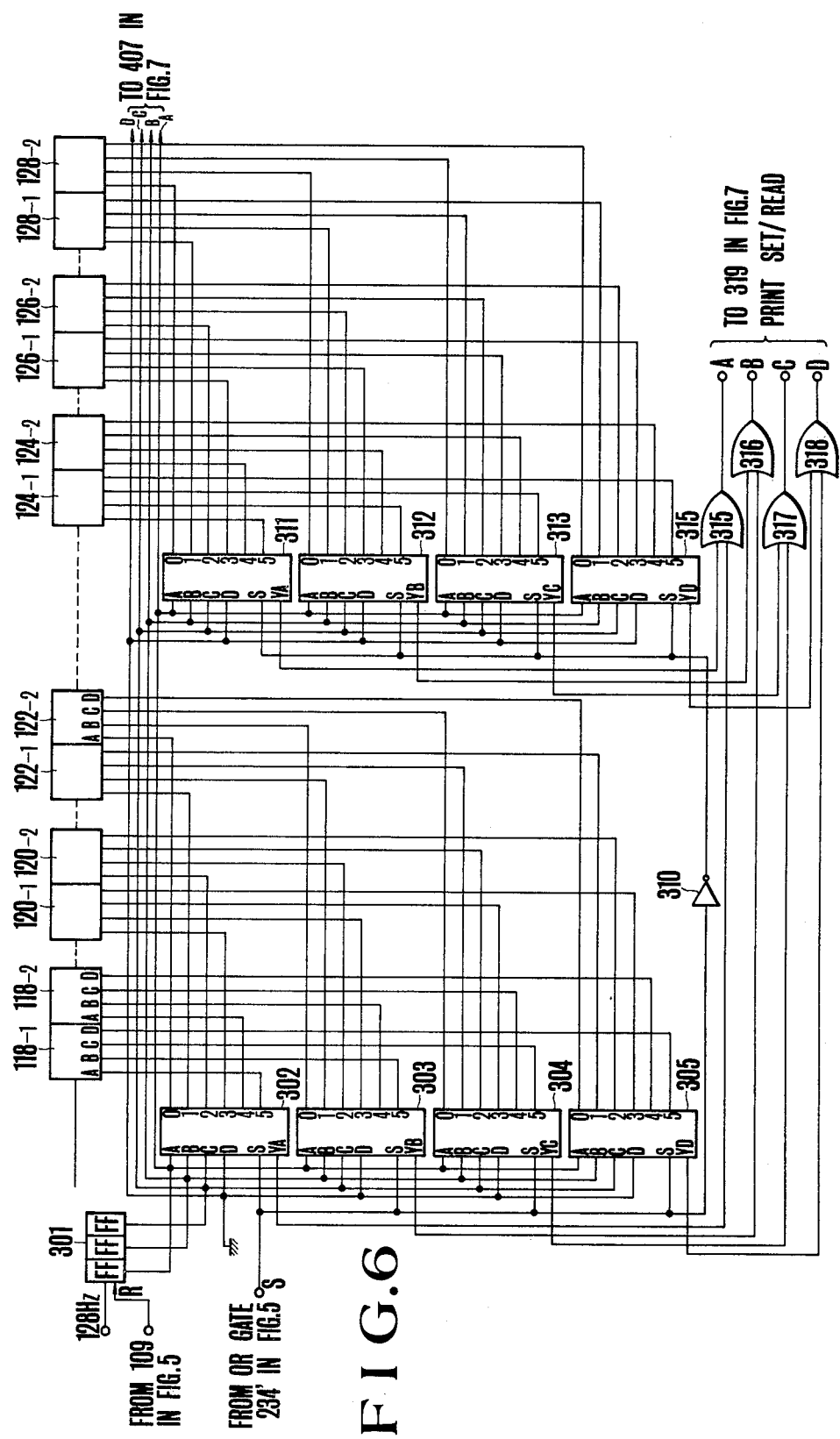
Figure 7:
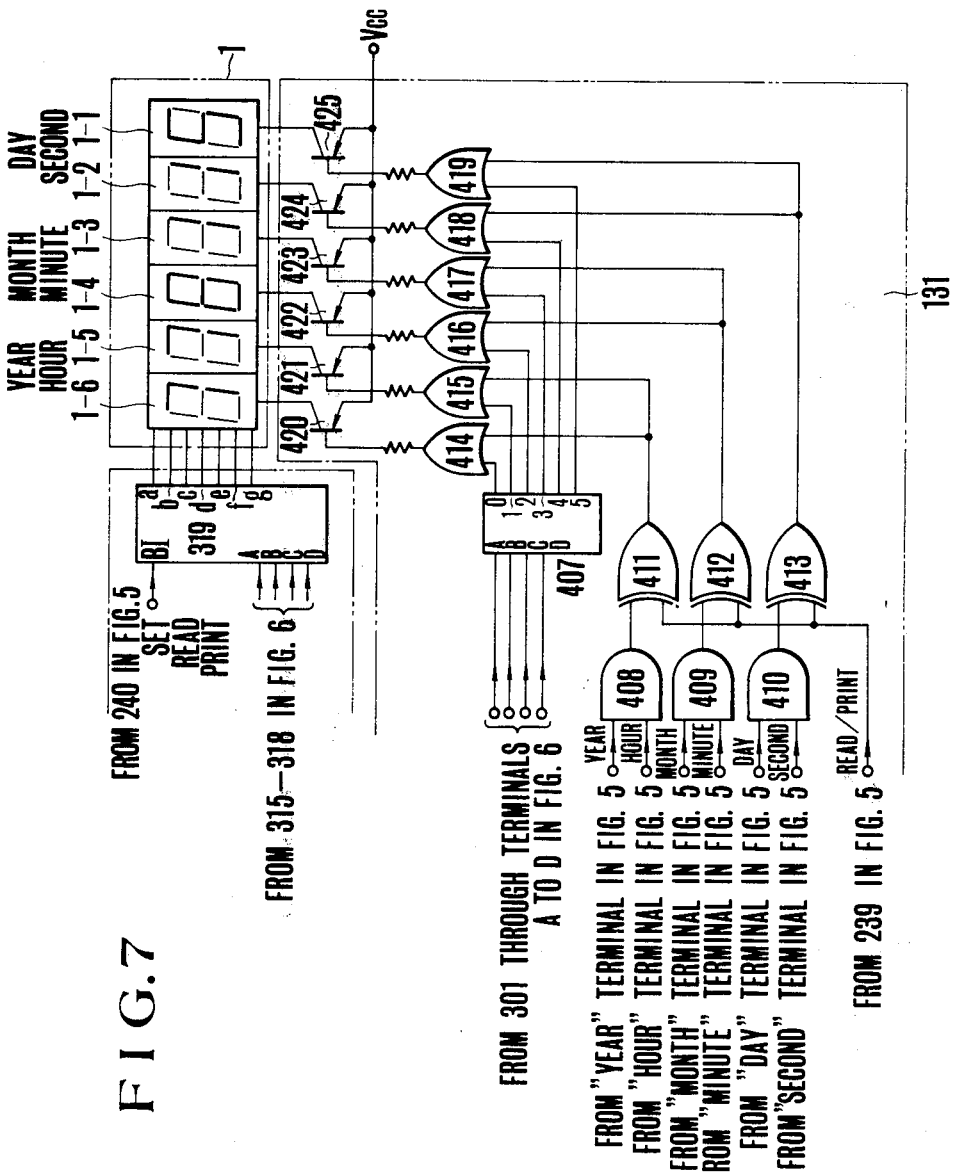

The last item for explanation is the data display and display controls with particular reference to FIGS. 6 and 7. The data display device 1 is comprised of six digit indicators each having seven segments of light-emitting diodes arranged to form a rectilinear "Figure eight" pattern, the rightmost and second indicators 1-1 and 1-2 being paired to read out either one of the data of the "second" and "day" counters 118 and 124, the third and fourth ones 1-3 and 1-4 being paired to read out either one of the data of the "minute" and "month" counters 120 and 126, and the fifth and sixth or left most ones 1-5 and 1-6 being apaired to read out either one of the data of the "hour" and "year" counters 122 and 128. For the sequence of representation of data in time or date, there is provided a digit driver 131 with the segment decoder/driver 129. As shown in FIG. 6, the segment decoder/driver 129 includes a 3-bit counter 301 with a "set" input connected to the output of the 128 Hz frequency divider 105 of FIG. 3, with a "reset" input connected to the output of the printing command signal responsive one-shot 109 of FIG. 5, and with the three output stages connected to respective inputs A, B and C of each of eight data selection control circuits 302 to 305 and 311 to 314 in the form of, for example, Texas Instrument SN74151, and further to respective inputs A, B and C of a BCD-to-Decimal decoder 407, for example, Texas Instrument SN7442, in the digit driver 131, while the outer input D of the BCD-to-Decimal decoder 407 being connected to the circuit earth together with those of the circuits 302 to 305 and 311 to 314.

Responsive to a binary (0, 0, 0) condition of the counter 301, all the first four data selection control circuits 302 to 305 select their output stages designated by a numeral character 0 for reading out the data of the binary code "1," "2," "3" and "4" (A B C D) bits in the counter 122-2 for the most significant digit of a number in hour respectively, when the "0" signal appears at the terminal S which is connected by way of a common lead to all the inputs S of the data selection control circuits 302 and 305 and further to those of the ones 311 to 314 through a common inverter 310. The outputs appearing at YA, YB, YC and YD of the circuits 302 to 305 are applied to a BCD-to-Decimal decoder 319 at inputs A to D thereof respectively after passing through OR gates 315 to 318 which are common to the other data selection control circuits 311 to 314. The BCD-to-Decimal decoder 319 has ten output stages including ones, a to g connected to the respective segments of each of the digit indicators 1-1 to 1-6. For the binary condition (0, 0, 0) of the counter 301, it also happens that the BCD-to-Decimal decoder 407 produces the only "0" output signal at a stage designated by 0 which is applied through an OR gate 414 to control operation of a switching transistor 420 for the left-most digit indicator 1-6. Because of the absence of any of READ, SET and COMMAND signals, the corresponding display is not effected.

Upon advent of a first pulse on the counter 301, the next output stages 1 of the data selection control circuits 302 to 305 are rendered effective to read out the data of the counter 122-1 for the least significant digit of the number in hour. Since the binary condition of the counter 301 changes from (000) to (001), the location of "0" state in the decoder 407 is shifted one so that a second switching transistor 421 for the least significant digit of the number in hour is selected to operate. The other output stages 2 to 5 of the decoder 407 are connected through respective OR gates 416 to 419 to switching transistors 422 and 425 for the digit indicators 1-4 to 1-1 respectively.

The digit drive control circuit 131 further includes three AND gates 408 to 410 with one inputs respectively connected to the outputs 2, 3 and 1 of the BCD-to-Decimal decoder 213 in block 117 corresponding to "hour," "minute" and "second" displays, and with the other inputs respectively connected to the outputs 4, 5 and 6 of the decoder 213 corresponding to "year," "month" and "day" displays, and three exclusive OR gates 411 to 413 with one inputs respectively connected to the outputs of the AND gates 408 to 410 and with the other inputs connected by way of a common lead to the output of the OR gate 239.

With READ signal of "1" level appearing at the output of the OR gate 239, the exclusive OR gates 411 to 413 produce "0" outputs which admit of the production of only one "0" signal from that one of the OR gates 414 to 419 which depends upon the location of output stage which producing "0" signal in the decoder 407, so that the corresponding digit is displayed, as the READ signal is also directed to the BI input of the counter 319 in the decoder 129.

To set the required values of second, hour and minute in this order, the operator will first open TIME/DATE selector switch SW3, and then close SET switch SW1 for the first time, causing only the AND gate 410 to produce a "0" output signal which is applied to the exclusive OR gate 413 at one input thereof, the opposite input of which receives a "0" signal from the OR gate 239 of FIG. 5, thereby only the rightmost pair of digit indicators 1-1 and 1-2 are selected to be driven for display of a number in second from the most significant to the least significant digit. When READ switch SW2 is closed subsequent to the first closure of switch SW1, the displayed number in second is extinguished, and, at the same time, instead of the rightmost pair of indicators, the leftmost pair of indicators 1-5 and 1-6 are selected to be driven for display of a number in hour, since the "0" signal appears at the input of only the AND gate 408. At a point in time when the displayed number is taken at the required value of hour, the operator has to open READ switch SW2. Then, he will turn to close SET switch SW1 for the second time, causing the "0" signal to appear at the input of only the AND gate 409 so that the intermediate pair of indicators 1-3 and 1-4 are driven to display a number in minutes.

In printing the data on the film 6, at the same time as that when the shutter control circuit of FIG. 2 produces an actuating pulse for the electromagnet Mg1, the timer of FIG. 5 produces a pulse of 0.5 second duration which is applied to both the OR gates 239 and 240. The "1" output signals of the OR gates 239 and 240 are applied to all of one inputs of the exclusive OR gates 411 to 413 so that the exclusive OR gates 411 to 413 produce "0" output signals for 0.5 seconds only, so that the indicator 1 is illustrated similarly as described before and the illumination is kept for 0.5 second to prior the data on the film. In the case of ASA 25, the period of energization of each digit indicator is 1/128 second in each cycle of precession of the six digit displays, and eight cycles of precession are repeated for each printing command. When to use with ASA 50, 100 and so on, the period of energization is made shorter $\frac{1}{2}$, $\frac{1}{4}$ times and so on, as much, depending upon the duty ratio mentioned above.

Figure 8:
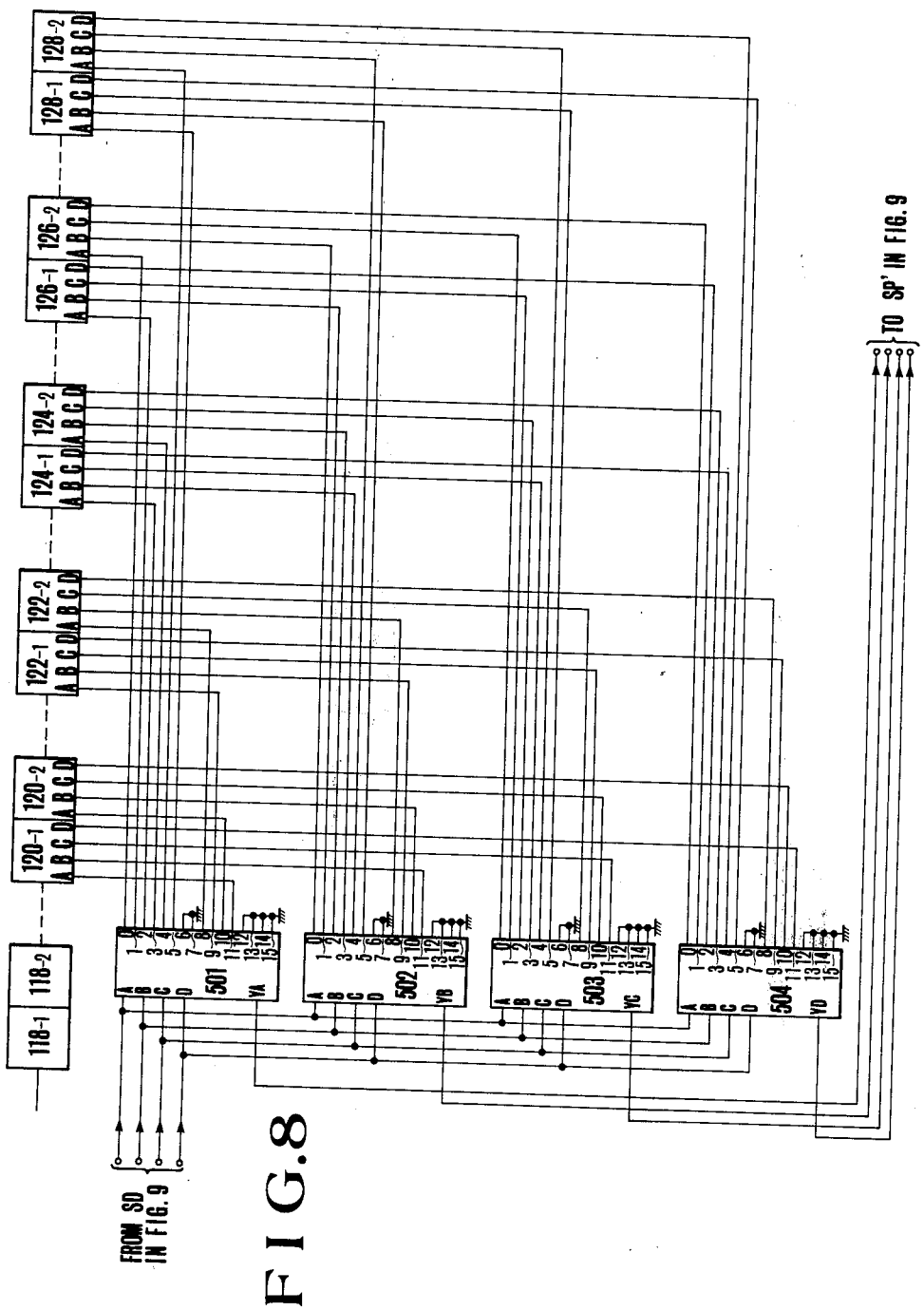
FIGS. 8 to 11 show another embodiment of a printing device according to the present invention adapted to decrease the number of indicators while maintaining the capacity of recording data unchanged.
Figure 13:
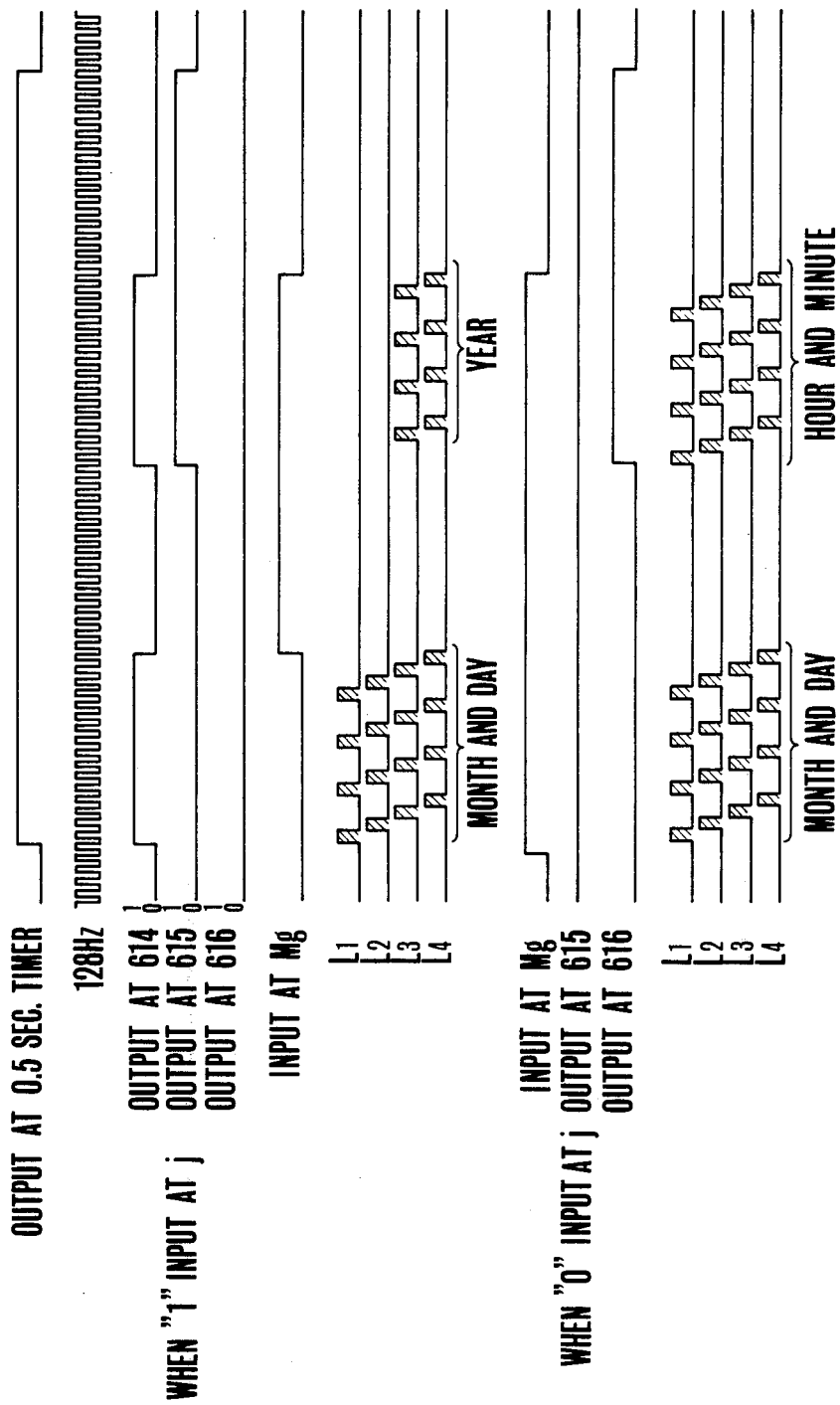
Figure 14:
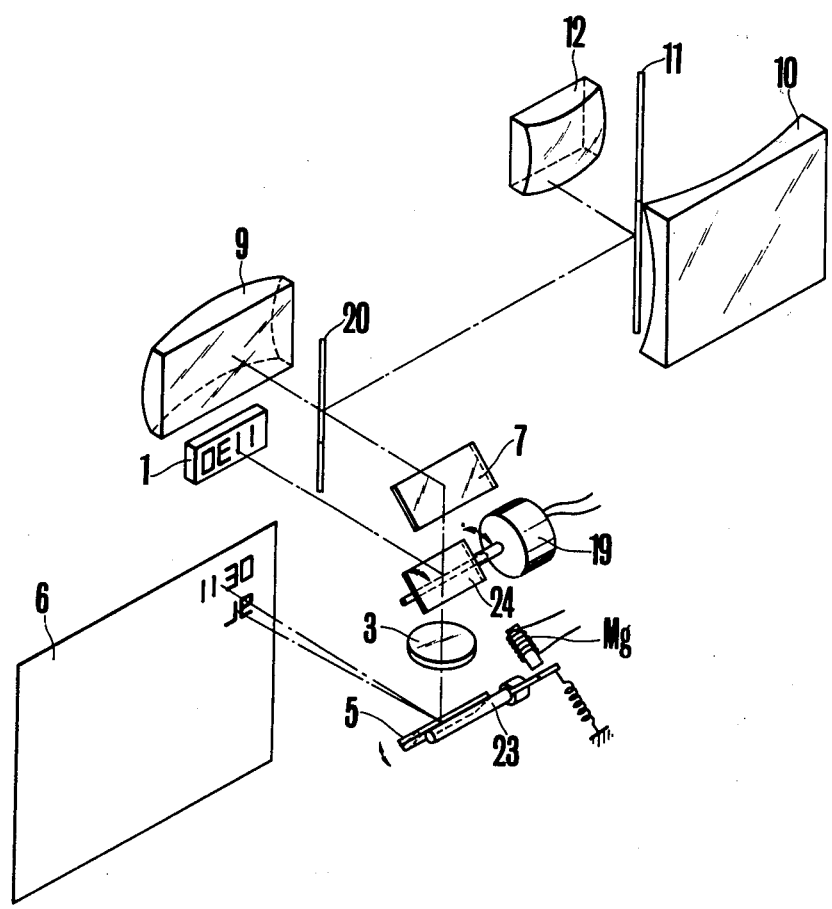
FIG. 14 is an exploded perspective view of the various optical components of the device.
Figure 15:
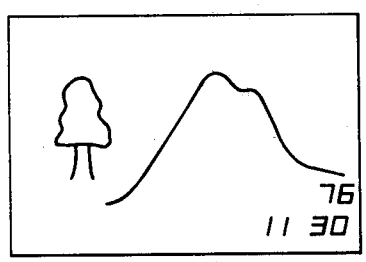
FIGS. 15 and 16 are pictorial representations illustrating different data images appearing in a selective manner to an observer looking through the camera finder.
Figure 16:
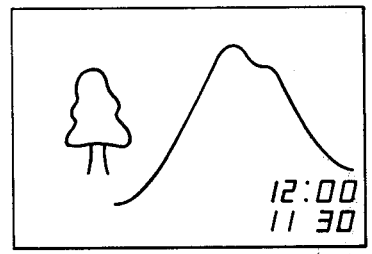

Another embodiment of the data printing device according to the invention is illustrated in FIGS. 8 to 16. This device is adapted to print concurrently two parts of data in spaced relation to each other on a common picture frame. In this embodiment, because of the unalternation of the circuit of FIG. 2 and the block diagram of the electronic clock of FIG. 3, the items for discussion with reference to FIGS. 2 and 3 are omitted. FIG. 8 shows a data selection control circuit corresponding to that 129 of FIG. 3. In this circuit, for the purpose of decreasing the necessary number of indicators, one of the two parts of the data, for example, "month and day" is displayed, and then the other part, for example, "year" or "hour and minute" is displayed by the same indicators as those for the first part. This is done by operating a reflection mirror for rotation after the first part has been printed, so that the second part for "year" or "hour and minute" is printed just above the first part as shown in FIGS. 15 and 16 respectively. In other words, the data selection control circuit of FIG. 8 functions to transfer the contents of the "month" and "day" counters 126 and 124 followed by the content or contents of the "year" counter 128 or "hour" and "minute" counters 122 and 120 to a segment decoder/driver M of FIG. 9 in response to the output of a decoder/driver control circuit K of FIG. 9. In FIG. 8, there are shown four data selectors 501 to 504 for selectively reading out the contents of the first to fourth output stages in each of the first and second places of the all counters 120 to 128.

Figure 9:
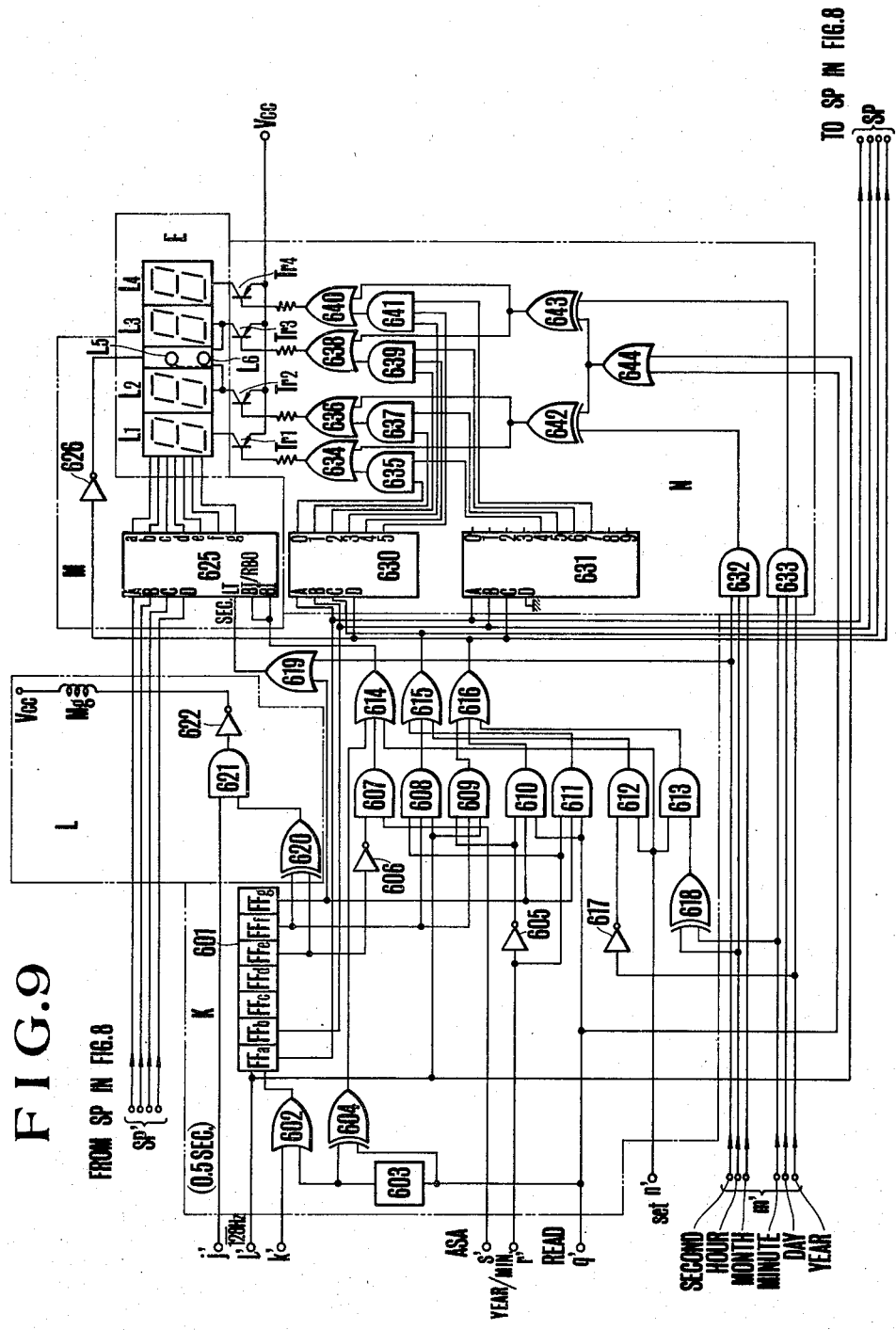

In FIG. 9, the segment and digit control circuit K comprises a 6-bit counter 601 having a "set" input connected to the output of the 128 Hz frequency divider of FIG. 3 and a "reset" input connected to an output of an OR gate 602, a one-shot 603 responsive to the closure of READ switch SW2 for producing an actuating pulse of short duration which is applied through the OR gate 602 to the "reset" input of the counter 601, an exclusive OR gate 604 responsive to the closure of READ switch SW2 for producing a "1" output signal after a time interval during which the counter 601 is operated to be reset, and a gating circuit of AND gates 607 to 613, OR gates 614 to 616 and 619, an exclusive OR gate 618, and inverters 606, 605 and 617.

In the gating circuit, the AND gate 607 when receiving a film speed dependent signal of 0.5 second duration from the time of occurrence of the printing command on wards controls the period of actuation of the display device E such that the first part of the data is displayed in a time interval between 0 and ⅜ second, and the second part is then displayed in a time interval between 4/8 and ⅞ second, as depending upon the output of a fifth flip-flop FFe in the counter 601. The AND gate 608 is rendered operative to result in the display a number in year for a time interval between ¼ and ⅜ counting from the printing command, when TIME/DATE selector switch SW3 is closed. When SW3 is open, the AND gate 609 is rendered operative to result in the display of a number in hour and minute. The AND gate 610 in response to the READ signal with SW3 closed causes the display device E to display "month and day" and "year" at a frequency of 2 Hz. The AND gate 611 operates in the opposite sense to that of AND gate 610 when SW3 is open so that "month and day" and "hour and minute" are displayed at a frequency of 2 Hz. The AND gates 612 and 613 operate with the SET signal so that the display is controlled by the output of a set sequence circuit C of FIG. 10 and the output of the counter 601. The outputs of the exclusive OR gate 604 and AND gate 607 and SET signal are applied to the OR gate 614 to produce "1" output signal when these inputs are of "1" level. This signal controls energization of dot indicators L5 and L6 in the display device E as selected by the output of the data selection control circuit of FIG. 8. The outputs of the AND gate 608, 611 and 612 are applied to the OR gate 615 which then produce an output. When this output is of "1" level, the content of "year" counter is displayed. The outputs of the AND gates 609, 610, 613 are applied to the OR gate 616 which produce an output. When this output is of "1" level, the contents of "hour" and "minute" counters are displayed. The OR gate 619 in response to the first closure of SET switch SW1 controls operation of the leftmost pair of digit indicators L1 and L2 to display a number 88 at a frequency of 2 Hz.

Block L is a reflection mirror drive control circuit comprising an exclusive OR gate 620 having two inputs connected to respective flip-flops FFe and FFf of the counter 601, an AND gate 621 having two inputs one of which is connected to the output of the exclusive OR gate 620 and the other of which is connected to receive print signal of 0.5 seconds, and a magnetic winding Mg connected through an inverter 622 to the output of the AND gate 621. In a time interval between 2/8 and ⅜ second from the input of printing signal, the magnetic winding Mg is energized from a voltage source Vcc to turn a reflection mirror 5 about a shaft 23 as shown in FIG. 14. Block M is a segment drive control circuit comprising a decoder 625 having four inputs A to D connected to the outputs YA to YD of the data selectors 501 to 504 and additional two inputs LT and BI (BI/RBI) connected to the outputs of the OR gates 619 and 614 respectively, and an inverter 626 through which the output of the OR gate 616 is applied to the dot indicators L5 and L6.

A digit drive control circuit N for selectively driving one of four digit indicators L1 to L4 at a time dependent upon the combined output of the circuit K, and set sequence circuit C comprises two binary coded decimal decoders 630 and 631 with inputs A and B each connected to the flip-flops FFa and FFb of the counter 601 respectively, with inputs C respectively connected to the outputs of the OR gates 615 and 616 and with inputs D respectively connected to the output of the OR gate 616 and to the circuit earth, two AND gates 632 and 633, the AND gate 632 being receptive of "month," "hour" and "second" set signals from the set sequence circuit C and the AND gate 633 being receptive of "day," "year" and "minute" set signals, two exclusive OR gates 642 and 643 with one inputs connected to the outputs of the AND gates 632 and 633, and with the other inputs connected to the output of an OR gate 644, additional four AND gates 635, 637, 639 and 641 with one inputs connected to the output stages 0, 1, 2 and 3 of the BCD-to-Decimal decoder 630, and with second inputs connected to the output stages 4, 5, 6 and 7 of the second BCD-to-Decimal decoder 631, the third inputs of the AND gate 639 and 641 being connected to the output stages 4 and 5 of the first BCD-to-Digital decoder 630, and four OR gates 634, 636, 638 and 640 with one inputs connected to the outputs of the AND gates 635, 637, 639 and 641 with other inputs connected to the outputs of the exclusive OR gates 642 and 643, and the outputs connected to the bases of transistors Tr1 to Tr4.

Figure 10:
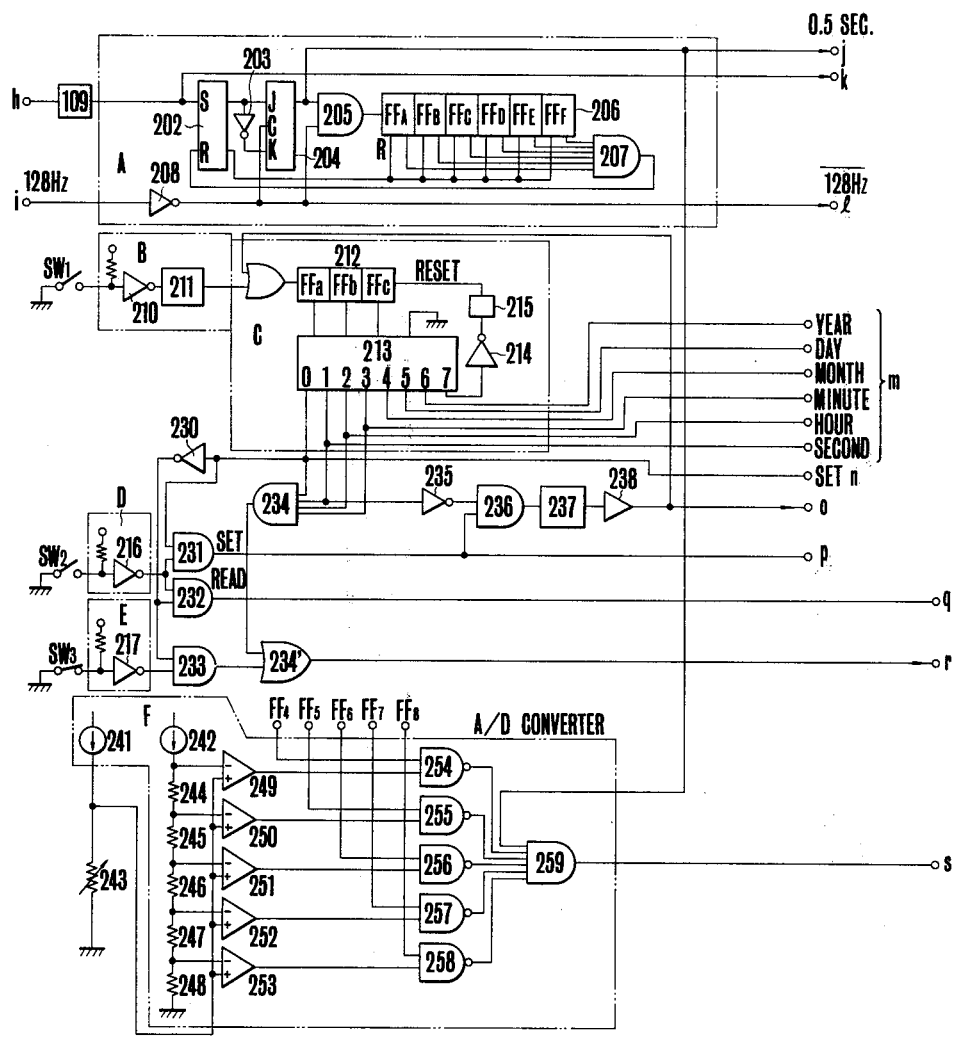

In FIG. 10, blocks A to F are similar in construction to those 115, 110, 117, 111, 112 and 114 of FIG. 5, while a logic circuit is different from that 116 of FIG. 6 in that the OR gates 239 and 240 are omitted. The circuitry of FIG. 11 is similar to that of FIG. 4.

Figure 11:
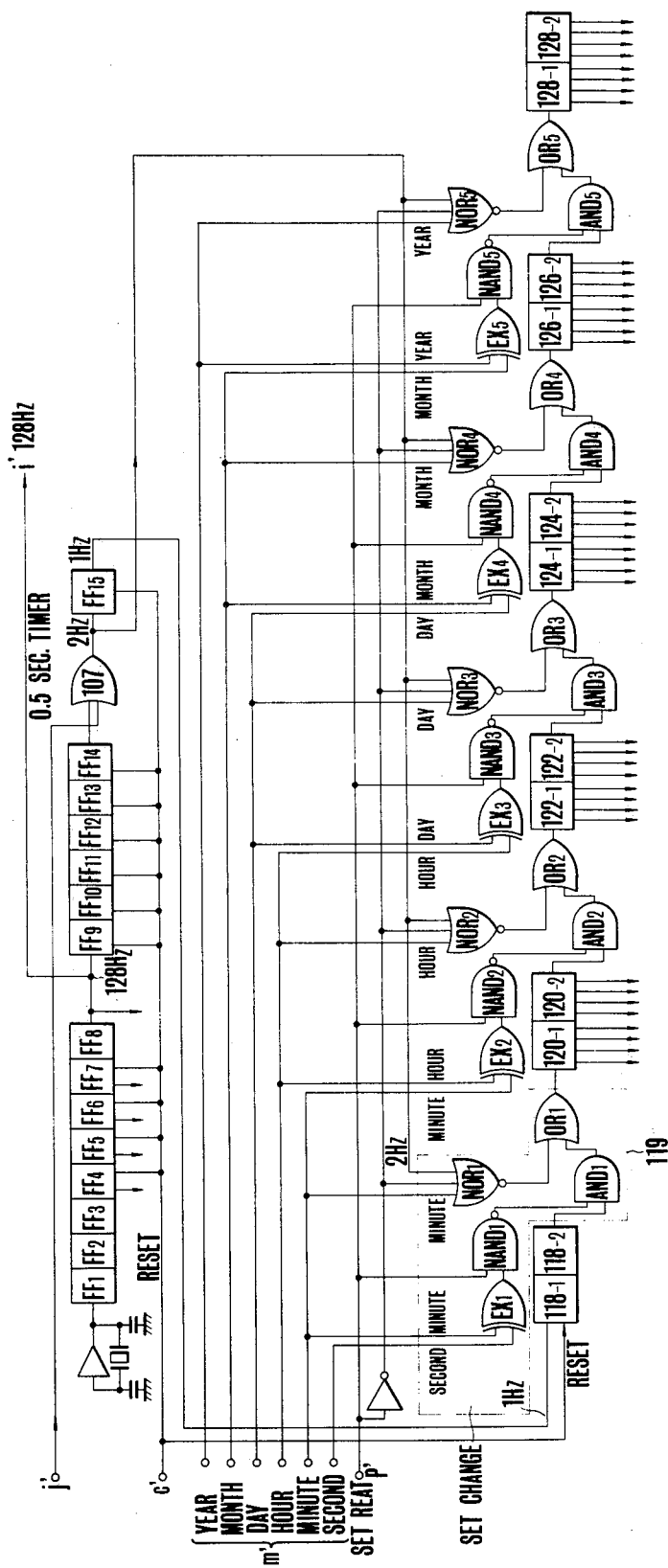

To an input terminal h is applied the printing command signal from the shutter control circuit of FIG. 2; to an input terminal, i, is applied a pulse train of 128 Hz frequency from the flip-flop FF8 of the frequency divider of FIG. 3; from an output terminal, j is produced a pulse (printing signal) of 0.5 second duration at the time of advent of the printing command signal on the input terminal, h, the output terminal, j being connected to input terminals, j' of FIG. 9 and FIG. 11; and from an output terminal, k is produced a PRESET signal which is applied to an input terminal, k' of FIG. 9. An additional output terminal, l of block A is for production of an inverted pulse train of 128 Hz frequency which is applied to the counter 601 through an input terminal, l' of FIG. 9. The set sequence circuit C have six output terminals, m for production of "year," "day," "month," "minute," "hour" and "second" set signals which are applied to respective input terminals, m' of FIG. 11 and FIG. 9. For production of a set signal there is a terminal, n which is connected to an input terminal, n' of FIG. 9. Terminals p, q, r and s produce a SET/READ signal, PRINTING/READ signal, TIME/DATE signal and ASA dependent PRINTING signal respectively.

The operation of the circuit of FIGS. 9 and 10 will next be explained by reference to FIGS. 12 and 13. For normal operation with READ switch SW2 set open, through the counter 601 operates with the pulse train of 128 Hz frequency from the flip-flop FF8 of the counter 105, the display device E remains ineffective for visual display, since a "0" signal appears at the BI input of the segment drive control circuit 625. In other words, the signals from the output terminals n, q and s of FIG. 10 all are of "0" level likewise as in FIG. 5, so that the output of the OR gate 614 of FIG. 9 is taken at "0" level.

Figure 12:
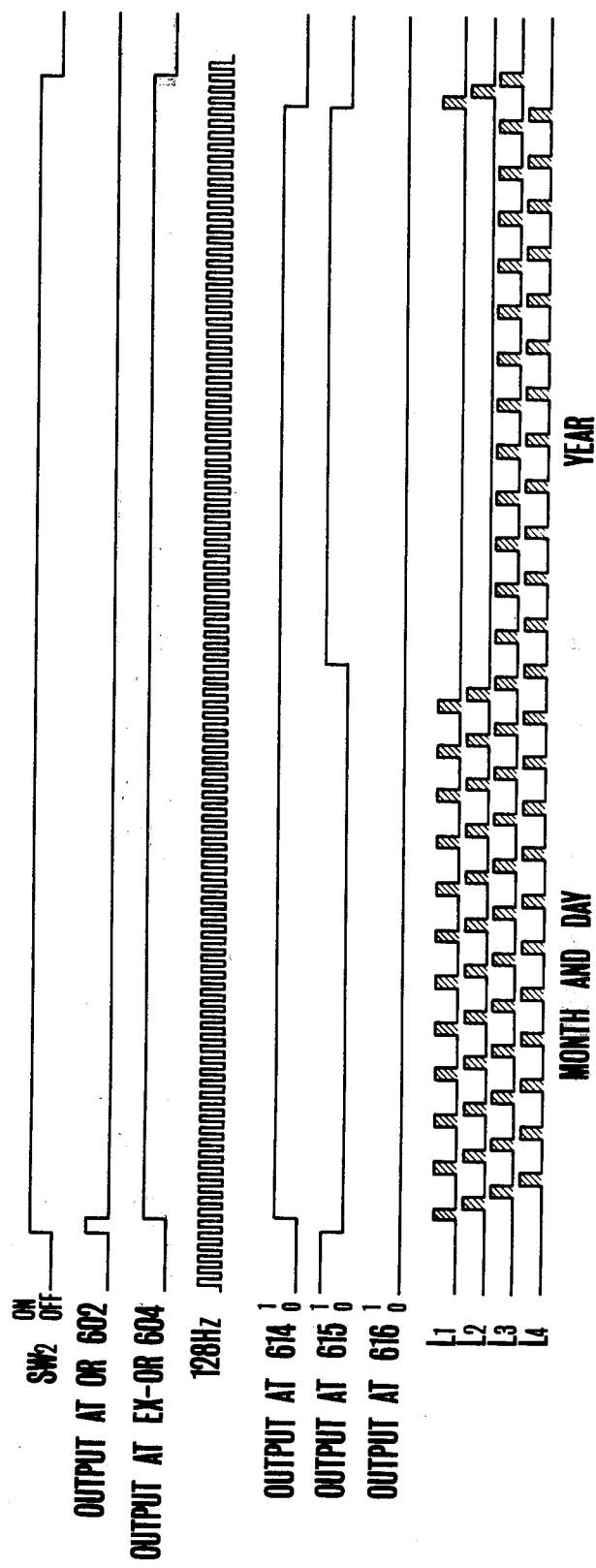
FIGS. 12 and 13 are pulse timing charts showing a manner in which the circuitry of FIGS. 8 to 11 may be operated.

When READ switch SW2 is closed, the output of the AND gate 232 in the logic circuit D of FIG. 10 changes from "0" to "1" level as shown on a first line in FIG. 12. Responsive to this signal, the one-shot circuit 603 produces a pulse of short duration which is passed through the OR gate 602 to function as a reset signal for the counter 601, as shown in a second line in FIG. 12. In synchronism with the tailing edge of the pulse, the exclusive OR gate 604 changes in output from "0" to "1" level as shown on a third line in FIG. 12. This signal is applied through OR 614 to the inputs BI/RBI and BI of the segment decoder 625, causing the display device E to operate in such a manner that during a time interval between 1/128 and ½ second counting from the time of closure of SW2, the contents of "month" and "day" counters 126 and 124 are displayed in the sequence of representation of the digits from the left most position of the rightmost position, as the READ signal also is applied through the OR gate 644 to the exclusive OR gates 642 and 643 at one input thereof, the opposite inputs of which receive all "1" signals from the set sequence control circuit C, thereby the outputs of the exclusive OR gate 642 and 643 are changed to "0" level with simultaneous occurrence of change in the one input of all of the OR gate 634, 636, 638 and 640 from "1" to "0," causing one of the digit indicators L1 to L4 to be lit for ½ second, depending upon the outputs of the AND gates 635, 637, 639 and 641. During a subsequent time interval between ½ and 1 second counting from the time of closure of SW2, as the output of the flip-flop FFg of the counter 601 is maintained at "1" level, either a number in year or two numbers in hour and minute is or are displayed by the rightmost pair of indicators L4 and L5 or by the both pair of indicators L1 to L4, depending upon whether or not TIME/DATE selector switch SW3 is closed. With SW3 opened, at the same time as that when the indicator L2 is lit, the upper dot indicator L5 is lit, informing the operator of the fact that the displayed number is in hour. When the displayed number is in minute, the lower dot indicator L6 is lit together with the digit indicator L3.

For more detailed discussion, when TIME/DATE selector switch SW3 is closed, a "1" signal appears at the input terminal r' of FIG. 9 and is applied through the inverter 605 to the AND gate 609 and 610 which are maintained in output at "0" level. Further, a "0" signal appears at the input terminal, n', causing the AND gates 612 and 613 to produce "0" outputs. As a result, the OR gate 616 produces "0" output as shown on a 7th line in FIG. 12. At all the three inputs of the AND gate 611 are connected to the input terminals q' and r' and the flip-flop FFg. In the first half of 1 second, therefore, the output of the AND gate 611 is maintained at "0" level, causing the OR gate 615 to produce an output as shown on 6th line in FIG. 12. For this reason, until the binary condition of the flip-flop FFg is changed to "1" at the termination of duration of ½ second from the start of counting operation of the counter 601, only the inputs A and B of each of the BCD-to-Decimal decoders 630 and 631 are caused to change between "0" and "1" levels at frequency of 128 and 64 Hz respectively with simultaneous occurrence of change in the outputs 0 to 3 thereof, as shown on 4th line in FIG. 12. When the BCD-to-Decimal decoder 630 produces an output signal (0111) from the stages 0 to 3 respectively, of the AND gates 635, 637, 639 and 641 there is only one AND gate 635 which produces "0" output signal, so that only one transistor Tr1 is rendered conducting to actuate only one indicator L1. With (1011) output of the BCD-to-Decimal decoder 630, only the second indicator L2 is lit; with (1101), only the third indicator L3 is lit; and with (1110), only the fourth indicator L4 is lit. Thus, a first cycle of precession is completed.

On the other hand, when the indicator L1 is to be lit, a signal of binary (0000) condition appears at the input terminals SD of FIG. 8 causing the data selectors 501 to 504 to operate with an output stage 0 so that the content of the counter 126-2 is read out to display the most significant digit of a number in month. When the indicator L2 is lit, the least significant digit of the number in month is displayed, as being read out of the content of the counter 126-1.

Then as the counting is proceeded by the counter 601 and "1" is output from the flip-flop FFg, the output of the AND gate 611 changes from "0" to "1" which is also the output of the OR gate 615, as shown 6th line in FIG. 12. This output is applied to the input C of the BCD-to-Decimal decoder 630, causing the outputs 4 and 5 of the BCD-to-Decimal decoder 630 to be changed between "1" and "0" levels, while the other outputs 0 to 3 are maintained at "1" level. As a result, only the rightmost pair of indicators L3 and L4 are rendered operative in sequence to display a number in year as shown in FIG. 12, since the inputs C of the data selectors 501 to 504 are also receptive of the "1" signal to read out the content of the counters 128-1 and 128-2.

With TIME/DATE selector switch SW3 set open, when the output of the flip-flop FFg changes to "1" level, the output of the AND gate 610 changes to "1" level which is applied through the OR gate 616 to the input D of the BCD-to-Decimal decoder 630, thereby all the first six output stages 0 to 5 are maintained unchanged at "1" level from the time onward. As the output of the OR gate 616 is connected to the input C of the second BCD-to-Decimal decoder 631, the output stages 4 to 7 of the BCD-to-Decimal decoder 631 changes between the binary "1" and "0" conditions, so that the indicators L1 to L4 are lit in sequence from the leftmost to the rightmost position to display two numbers in hour and minute as being read out of the contents of the counters 122 and 120 respectively.

If the operator is required to change the displayed numbers, he needs to close SET switch SW1 of FIG. 10, causing the binary coded BCD-to-Decimal decoder 213 in the set sequence circuit C to change in binary conditions of the first and second output stages 0 and 1 from (01) to (10). The "1" signal appearing at "set" input terminal, n', of FIG. 9 is applied to the AND gates 612 and 613 and OR gate 614, while the "0" signal appearing at "second" set input terminal, m, is applied to the AND gate 632 in the digit drive control circuit N and also is the OR gate 619, thereby the output of the AND gate 632 is changed to "0" level. As the outputs of the AND gate 633 and OR gate 644 remain unchanged from "1" and "0" levels respectively, the output of the exclusive OR gate 642 changes to "0" level, while the output of the exclusive OR gate 643 remains at "1" level, so that the leftmost pair of digit indicators L1 and L2 are selected for display operation, and the rightmost pair of digit indicators L3 and L4 are prevented from operating. On the other hand, as the "0" signals appear at the opposite inputs of the AND gates 612 and 613 to those at which the "second" set signal of "0" level appears, the BCD-to-Decimal decoders 630 and 631 and the data selectors 501 to 504 are adapted to read out the contents of "month" and "day" counters of FIG. 8. The "second" set signal of "0" level also is applied to the OR gate 619 at one input thereof, the opposite input of which receives a pulse train from the flip-flop FFg at a frequency of 1 Hz, so that the decoder 625 selects all the segments of each of the digit indicators L1 and L2 at a time to display a number 88 one digit, i.e., 8, for every one second, informing the operator of the fact that what is to be set is in second.

When READ switch SW2 is closed in synchronization with zero in second with the standard clock, the logic circuit of FIG. 10 produces a "reset" signal for the counters 105, 106, 108 and 118 of FIG. 11. As this signal also serves to increase the number of pulses counted by the counter 212 by one, the binary coded BCD-to-Decimal decoder 213 changes in the third output stage from "1" to "0" condition. Responsive to this "0" signal, the exclusive OR gate 618 changes its output from "0" to "1" level, causing the data selectors 501 to 504 to read out the contents of "hour" and "minute." On the other hand, the output of the AND gate 632 is unchanged to permit operation of only the leftmost pair of indicators L1 and L2 together with the upper dot indicator L5. So long as the READ switch SW2 is closed, the displayed number is increased at a speed of 2 Hz. When the ever-varying numbers have reached a required or desired value, the operator has to open the READ switch SW2. Thus, the value of hour is set in the electronic clock.

To set a required or desired value of minute, the operator needs to close SET switch SW1 again or at a second time, the AND gate 632 changes its output from "0" to "1," and the AND gate 633 changes its output from "1" to "0," while the output of the exclusive OR gate 618 is unchanged from "1," thereby the rightmost pair of digit indicators L3 and L4 together with the lower dot indicator L6 are rendered operative instead of the indicators L1, L2 and L5.

At a third time of closure of SET switch SW1, the BCD-to-Decimal decoder 213 changes its 4th and 5th output stages 3 and 4 from the binary (01) to (10) conditions respectively, causing the AND gate 234 to produce at a first time an output signal of "1" level which is applied through the OR gate 234' and terminal r-and-r' connection to the AND gates 608 and 611 and further through an inverter 605 to the AND gates 609 and 610, thereby the contents of "month and day" counters are read out. On the other hand, however, the output of the AND gate 633 remains unchanged from "1" level, so that only the leftmost pair of digit indicators L1 and L2 are rendered operative, while the output of the AND gate 613 is changed to "0" level causing the upper dot indicator L5 to be inoperative. When the closure of SW1 is followed by the closure of READ switch SW2, a number in month is displayed from the most to least significant digit each for 0.5 seconds.

At a fourth time of closure of SET switch, the AND gate 632 changes its output to "1" and the AND gate 633 changes its output to "0," so that instead of the leftmost pair of digit indicators L1 and L2, the rightmost one is rendered operative, while the lower dot indicator L6 also is in the inoperative state. When this closure of SW1 is followed by the closure of READ switch SW2, a number in day is displayed. The rightmost pair of digit indicators L3 and L4 are again rendered operative when SET switch SW1 is closed at a fifth time, because the "day" and "year" signal lines are connected to the common AND gate 633. On the other hand, the signal on "year" line is inverted by the inverter 617 to "1" signal which is applied to the AND gate 612, causing the content of "year" counter to be read out. After the required for desired value of year has been set in the clock by operating READ switch SW2, the operator must close SET switch SW1 at a sixth time, thereby the BCD-to-Decimal decoder 213 changes its output at the stage 7 from "1" to "0" level. This signal serves as a reset signal for the counter 212. Thus, the BCD-to-Decimal decoder 213 is again actuated to be reset in the initial binary condition.

For printing operation, when a printer command signal occurs likewise as in the first embodiment of the invention, the one-shot 109 produces a pulse of short duration which is applied to the "set" input of the S-R flip-flop in block A of FIG. 10 and also to the OR gate 602 in block K of FIG. 9 through the terminals k-and-k' connection, thereby the counter 601 is reset and the 0.5 second timer A starts to produce an output signal of "1" level, as shown on a 1st line in FIG. 13. During a time interval from the start of production of this "1" signal to a time at which the output of the flip-flop FFe changes from "0" to "1" level, the output of the OR gate 614 which is applied to the BI and BI/RBS of the decoder 625 is maintained at "1" level, as shown on a 3rd line in FIG. 13. The pulse of 0.5 second duration is also applied to the OR gate 644 of FIG. 9 and to the AND gate 259 of FIG. 10. In the above mentioned time interval ranging from zero to $\frac{1}{2}$ second, therefore, two numbers in month and day are displayed by the digit indicators L1 to L4 with a luminous intensity controlled by the output of the A/D converter F of FIG. 10 in accordance with the sensitivity of the used film 6. At the termination of duration of the time interval, in other words, when the flip-flop FFe is set to "1" level after the elapse of $\frac{1}{2}$ second, the output of the AND gate 609 changes to "0" and therefore the output of the OR gate 614 changes to "0" as shown on 3rd line in FIG. 13, thereby the display is stopped, and the mirror drive circuit L is actuated to turn with the resultant deflected position of the light path permitting the subsequent number in year to be printed on an area just above that of the numbers in month and day already printed as viewed in FIG. 15. The mirror 5 of FIG. 14 is maintained in the turned position so long as the outputs of the flip-flops FFe and FFf, as combined by the exclusive OR gate 620, are taken at the opposite state to each other, in other words, during a time interval between $\frac{1}{8}$ and $\frac{2}{8}$ seconds as shown on a 7th line in FIG. 13.

After the elapse of 2/8 seconds counting from the occurrence of the printing command signal, both the outputs of the OR gates 614 and 615 change to "1" level, resulting in the display of a number in year with a luminous intensity equal to the above for $\frac{1}{8}$ second. At the termination of duration of this time interval, that is, after the elapse of $\frac{3}{8}$ second counting from the occurrence of the printing command, the flip-flop FFf changes its output again to "0" level, thereby the second time display is stopped. When numbers in hour and minute are to be printed subsequent to the numbers in month and day, the OR gate 616 is rendered effective instead of the OR gate 615 to control the start of display of the second part of the total data, as shown on a 13th line in FIG. 13.

In FIG. 14, there is shown an example of construction and arrangement of the essential parts of an optical arrangement of the printing device in the second embodiment of the invention, and the same reference characters have been employed to denote the similar parts to those of FIG. 1. A reflection mirror 24 is normally set in a position illustrated by dashed lines where light from the display 1 is reflected to the reflection mirror 7 and therefrom to the half-mirror 20 by which the light is splitted into two parts one of which is transmitted to the enlarger lens 9, and the other of which is reflected to the finder optical systems 10 to 12. When the data is to be printed, the first mirror 24 is moved to the position illustrated by solid lines where light from the display 1 is reflected to the image forming lens 3 and directed through the lens 3 to the third reflection mirror 5 by which the light is projected onto the film 6. The first reflection mirror 24 is driven by the electromagnetic drive mechanism 19 including the magnetic winding Mg2 of FIG. 13. It is to be noted here that when the reflection mirror 24 is constructed from a plate, both of the surfaces of which are mirrored and arranged to be rotatable in either direction as indicated by arrows, while the light arrangements for printing and observation are light-tightly shield, it is possible to protect the film against fogging. The third reflection mirror 5 is arranged to be rotatable about the shaft 23 to a small extent under the action of the magnetic winding Mg of FIG. 9, so that the two parts of the data can be printed in spaced relation to each other on a common picture frame.

With this optical arrangement of the printing device, when the display 1 is desired to be observed, the mirror 24 is moved to the dashed line position, thereby the operator looking through the eye-piece 12 or at the enlarger lens 9 is enabled to examine the data displayed at 1. When the data is printed, the magnetic winding Mg2 is energized to move the mirror 24 to the solid line position, so that an image of the data displayed at 1 is formed on the film 6 at a lower right-hand corner of each picture frame as shown in FIGS. 15 and 16. Before the magnetic winding Mg is energized, the third mirror 5 is set in the solid line position under the action of a bias spring, and the data in month and day are printed nearer the bottom edge of the frame. When the magnetic winding Mg is energized, the projection light path from the mirror 5 is deflected slightly downward so that the data in year or hour and minute are printed just above the former one.

Figure 17:
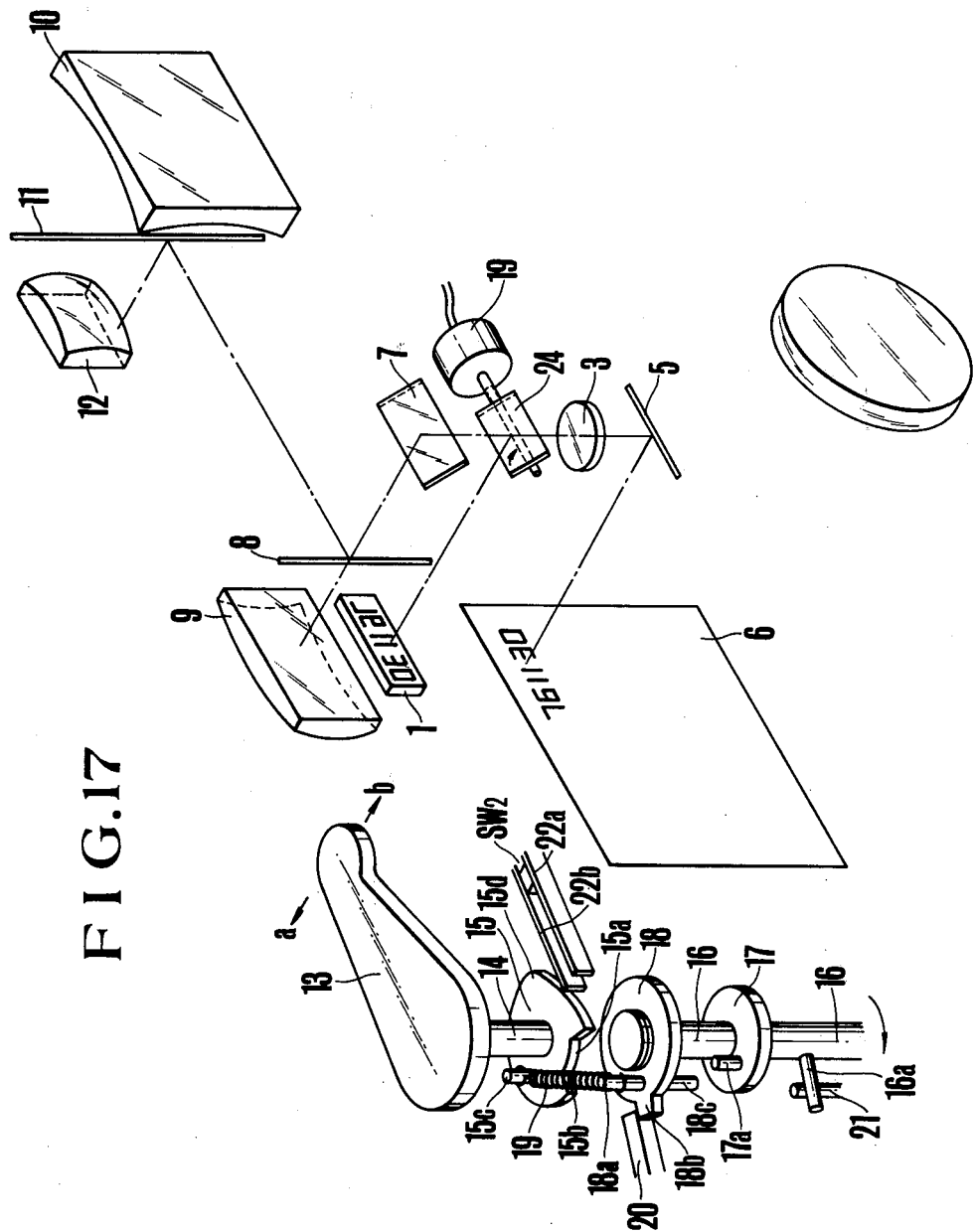
FIGS. 17 to 19 are exploded perspective views of three different examples of an optical arrangement for looking at what data are to be, or were printed through the camera finder or from a window on the camera housing, while still permitting an actuating switch for the display of the data to cooperate with a film winding lever.

FIG. 17 shows an example of arrangement of the READ switch SW2, as operating with an actuator therefor connected to a film winding lever 13. This actuator is constructed in a cam disc 15 fixedly secured to the common shaft 14 of the lever 13. Positioned in axial alignment with the shaft 14 is a driven shaft 16 fixedly carring a flange 17 remote from the top end thereof, on which a clutch disc 18 is mounted so as to be rotatable relative thereto under a suitable frictional action. The cam disc 15 is provided with a cutout 15a through which a pin 18a extends from the clutch disc 18. A spring 19 is tensioned between the pin 18a and a pin 15c, the latter being planted on the cam disc 15, while the clockwise movement of the clutch disc 18 is limited by a stopper 20, so that the lever 13 tends to be turned in a counter-clockwise direction indicated by arrow, a, until the radial shoulder 15b formed at one end of the cutout 15a abuts the pin 18a. The flange 17 is provided with a pin 17a upwardly extending into the path of movement of a pin 18c downwardly extending from the clutch disc 18 so that when the lever 13 is cocked to advance the film through the length of one frame, the driving torque is transmitted through the pin 18c-and-pin 17a connection to the driven shaft 16. The READ switch SW2 is arranged adjacent a hump 15d of the cam disc 15 upon clockwise movement of the cocking lever 13 from the illustrated position to be closed, as a movable contact 22b is brought into contact with a fixed contact 22a of the switch SW2. When the operator's finger is removed from the lever 13, the latter is automatically returned to the illustrated position by the action of the spring 19. Clockwise movement of the driven shaft 16 is limited by a stopper 21 when a radial pin 16a of the shaft 16 abuts on the stopper 21.

Figure 18:
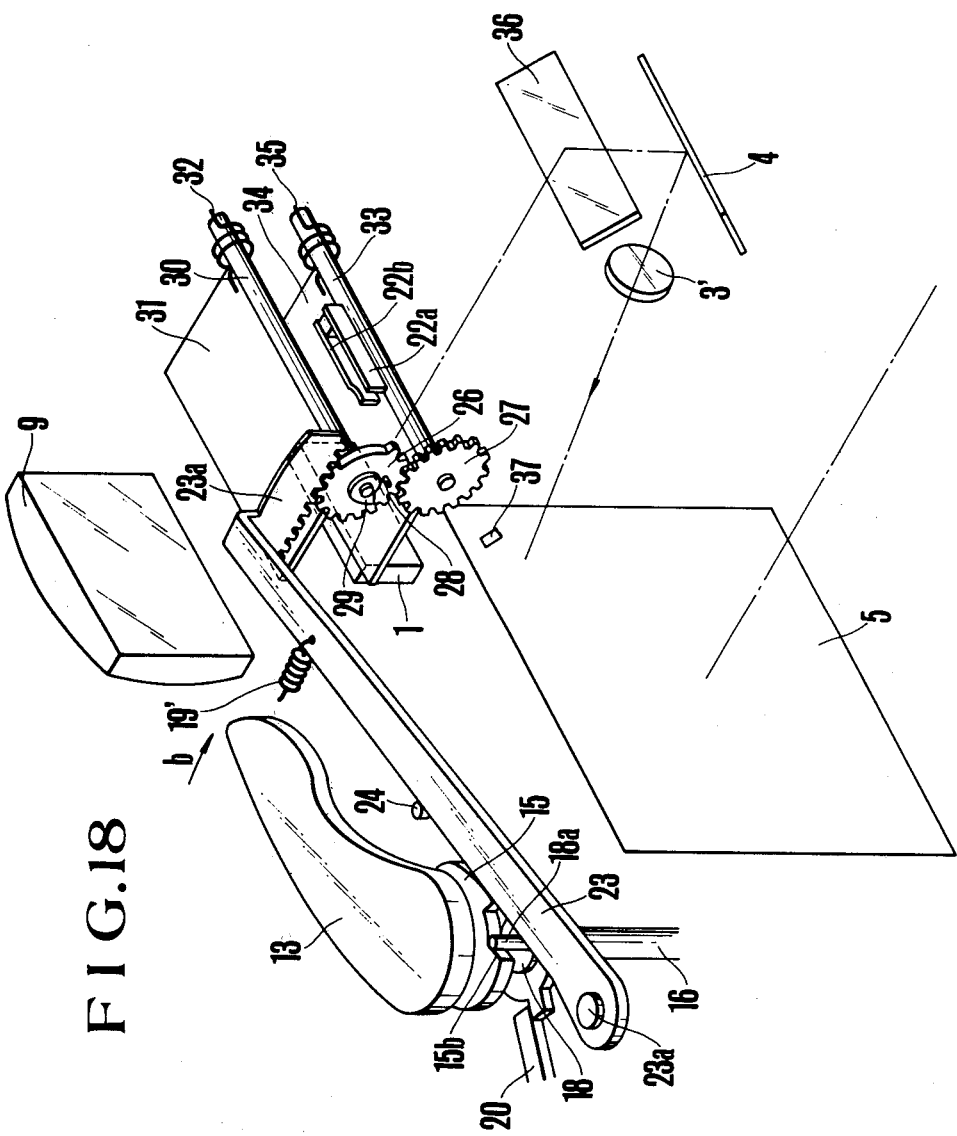
Figure 19:
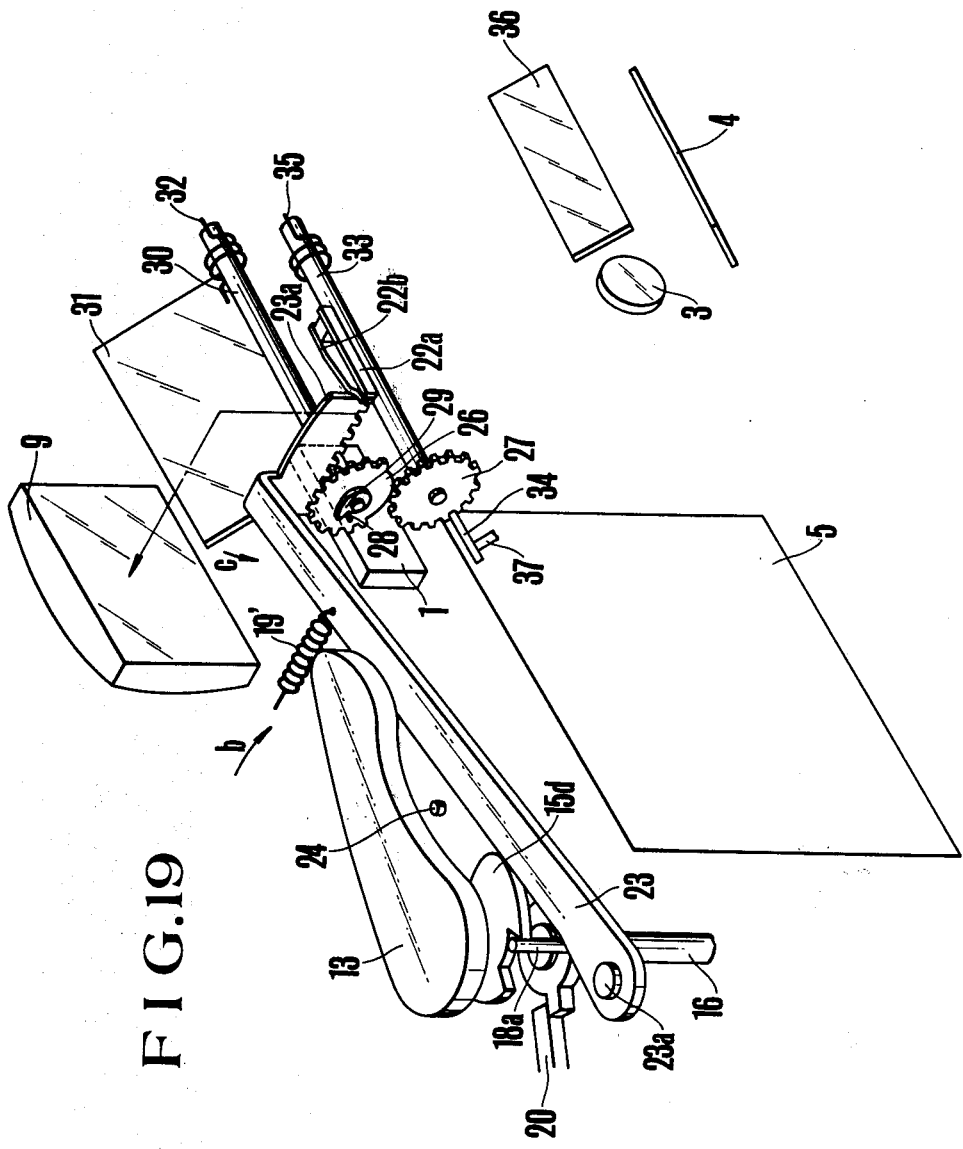

Though not shown in any of FIGS. 1, 14 and 17, provision is made for preventing the film 6 from fogging with light which would be otherwise permitted to enter from the viewing system of the printing device of the invention. An example of this provision is shown in FIGS. 18 and 19 for a printing and viewing position respectively, wherein the same reference characters have been employed to denote the similar parts to those shown in FIG. 17. When the lever 13 is turned in a clockwise direction from the position illustrated in FIG. 18 to which it is retracted after each cycle of winding operation, a drive lever 23 is turned in a clockwise direction about a pivot pin 23a against the force of a bias spring 19′ in engagement with a lug of the cam disc 15, while a lower mirror 34 is first turned and then followed by an upper mirror 31 to respective positions illustrated in FIG. 19 where the display 1 can be viewed by the operator looking through the lens 9.

A mechanism for controlling operation of the upper and lower mirrors 31 and 34 in such a manner as described above comprises a rack 23a formed in a bent-off portion of the drive lever 23, a first gear 26 engaging the rack 23a and rotatably mounted on a shaft 30, the latter being fixedly secured to the support frame for the first mirror 31, a second gear 27 engaging with the gear 26 and fixedly mounted on a shaft 33, the latter being fixedly secured to a support frame for the lower mirror 34, a pawl disc 29 fixedly mounted on the shaft 30, and a pin 28 extending from the first gear 26 into the path of movement of the pawl of disk 29. The first gear 26 is provided with a cutout arranged at such a location that when the lower mirror 34 is turned to make an angle of 45° with the optical path indicated by dot-and-dash line, the first gear 26 is permitted to rotate independently of the second gear 27, causing the upper mirror 31 to be turned in a clockwise direction against the force of a spring 32 as driven by the pawl disk 29 engaging with the pin 28 until the upper mirror 31 makes an angle of 45° with the optical axis of the lens 9. At the terminal end of movement of the cocking lever 13, the READ switch SW2 is closed by the forward end of the racked portion 23a. When the operator's finger is removed from the cocking lever 13, the drive lever 23 is returned to abut against a stopper pin 24 under the action of the spring 19', while driving the second gear 27 to rotate in the clockwise direction against the force of a spring 35. Counter-clockwise movement of the lower mirror 34 is limited by a stopper 37.

Figure 20:
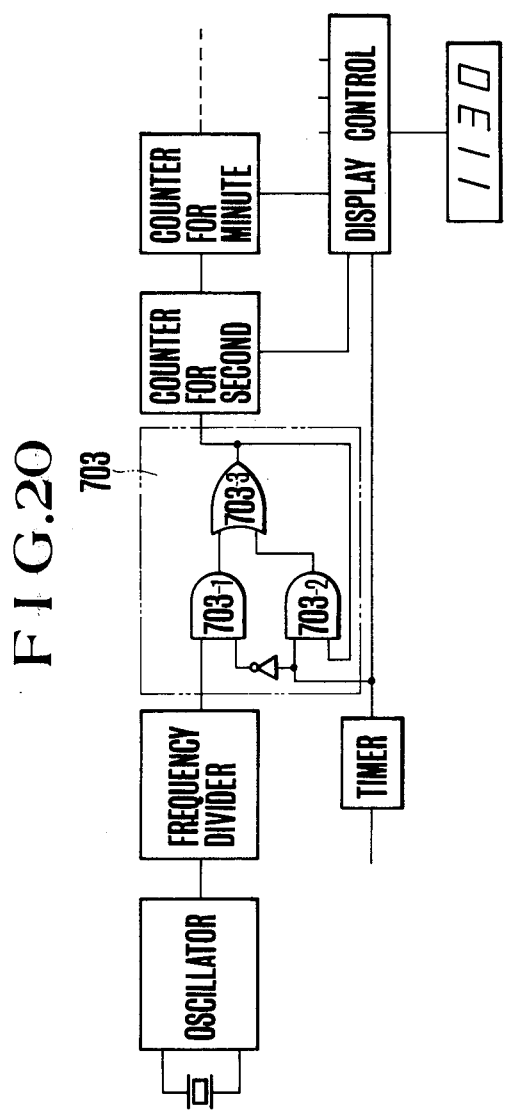
FIG. 20 is a schematic electrical circuit diagram, partly in block form, of an example of modification of the printing device of the invention with the provision of a latch for the display of the data.

FIG. 20 shows a third embodiment of the invention with provision of a latch circuit 703 connected between a frequency divider and a "second" counter corresponding to those FF1 to FF15 and 118 of FIG. 4 and of which latching operation is controlled by the output of a timer corresponding to that 115 of FIG. 5 in such a manner that what data particularly in time second are to be printed will be the same as those which are stored in the "second," and like counters at a point in time when the printer command occurs. It is to be noted here that, though the first and second embodiments of the invention ensure the prevention of the data from changing during the period of printing operation, the printed data are not always the same as those which are stored in the "second" and like counters when the printer command occurs.

Figure 21:
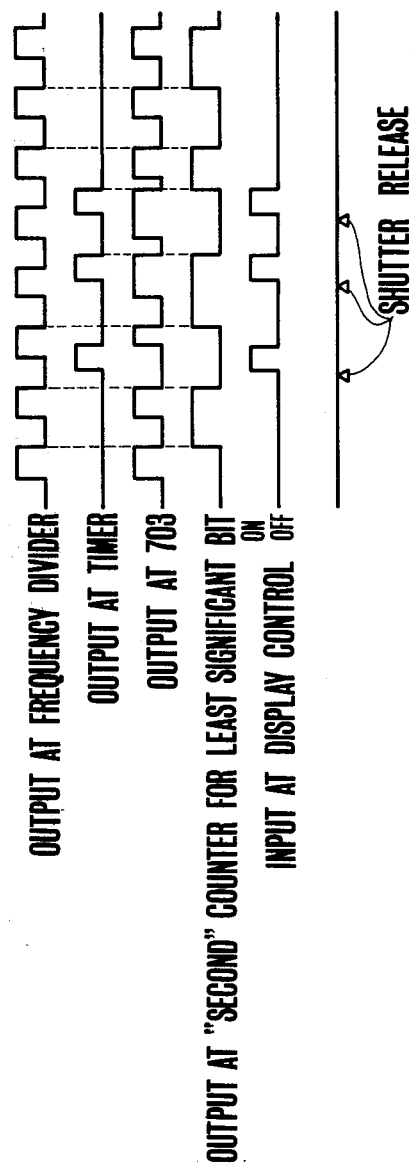
FIG. 21 is a pulse timing chart showing a manner in which the circuit of FIG. 20 may operate.

The latch circuit 703 comprises a first AND gate 703-1 having one input connected to the output of the frequency divider and another input connected to the output of the timer through an inverter, and a second AND gate 703-2 having one input connected directly to the output of the timer and another input connected to the output of an OR gate 703-3 with one input connected to the output of the first AND gate 703-1 and with another input connected to the output of the second AND gate 703-2. Now assuming that what time is when the printer command occurs is the same as that at which the output of the frequency divider takes a "0" level as shown in FIG. 21, then the output of the OR gate 703-3 also is of "0" level, causing the second AND gate 703-2 to produce a "0" output and therefore causing the first AND gate 703-1 to produce a "0" output, thus the output of the OR gate 703-3 being maintained at "0" level to hold the contents of the "second" counter until the printing is completed.

Figure 22:
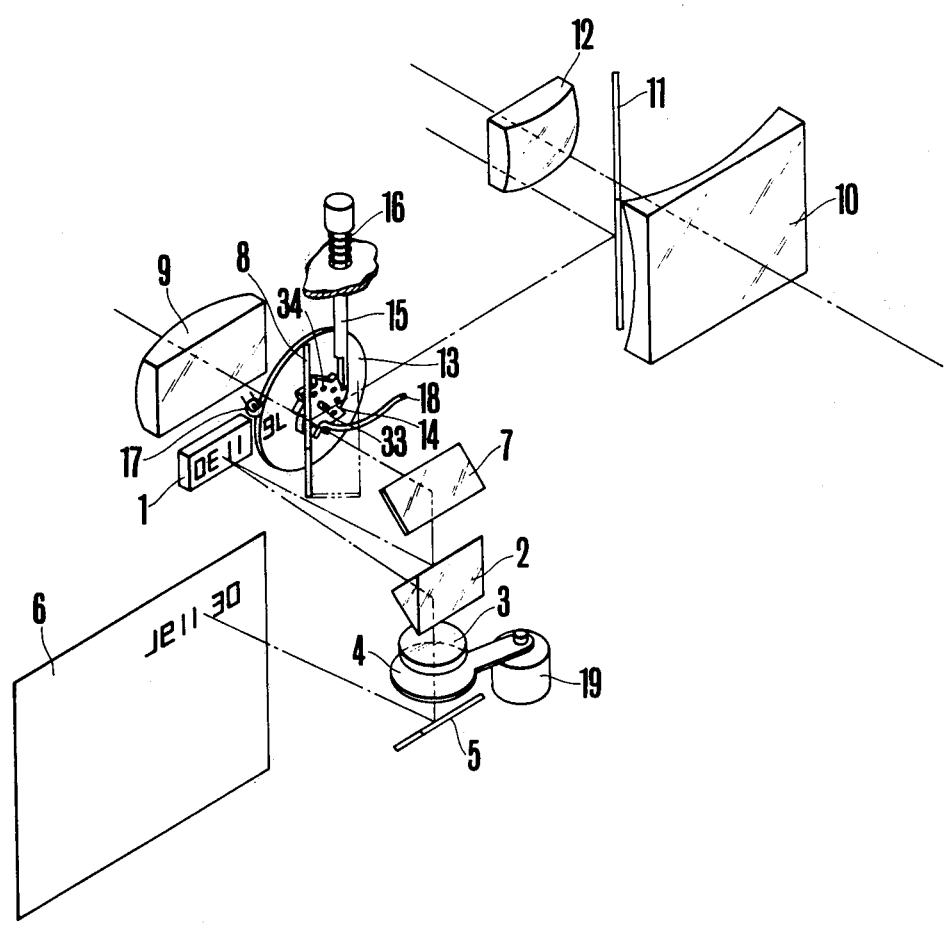
FIG. 22 is an exploded perspective view showing an example of modification of the optical arrangement of FIG. 1 with the provision of an additional data entry mechanism positioned adjacent the digital clock.

FIG. 22 shows a furthermore embodiment of the data printing device of the present invention, wherein the same reference characters have been employed to denote the similar parts to those shown in FIG. 1. Instead of using the "year" counter 128, there is made use of a "year" dial 13 arranged just ahead of the digital display device 1 to be rotatable so that the one of the numbers in year which is laterally aligned with the digital display 1 is increased by one for each actuation of a control mechanism. This mechanism comprises a ratchet gear 14 fixedly mounted on the dial 13 and rotatable about a common shaft 33 of the dial 13, an operating rod 15, one end of which extends through a hole in the upper panel of the camera housing and outwardly beyond it to form a button, a spring 16 which tends to move the rod 15 upwardly, and an index pawl 18 for adjusting the angular position of the dial 13 when the dial 13 is driven for rotation by the depressed rod 15 engaging with one of the ratchet teeth. To illuminate the indicium on the dial 13 there is a light source 17. The luminous intensity of the light source 17 is controlled in accordance with the sensitivity of the used film by means now shown. To minimize the consumption of electrical energy, it is preferred to use an additional "year" dial cooperative with the dial 13 so that there is no need to energize the lamp 17 when the displayed data are examined. To facilitate discrimination of the displayed two numbers from each other while nevertheless reducing the size of number bodies, there is provided a supplementary optical system comprising a pair of cylindrical lenses 27 and 28 of which the optical axes are normal to each other, the former 27 being parallel to the line of array of digits at 1, as shown in FIG. 23, and a prism structure having four exit plane surfaces inclined to each other so that the space between the first and second numbers is increased, while the first and second digits in each number are laterally compressed in a space therebetween as shown in FIG. 24.

Figure 25:
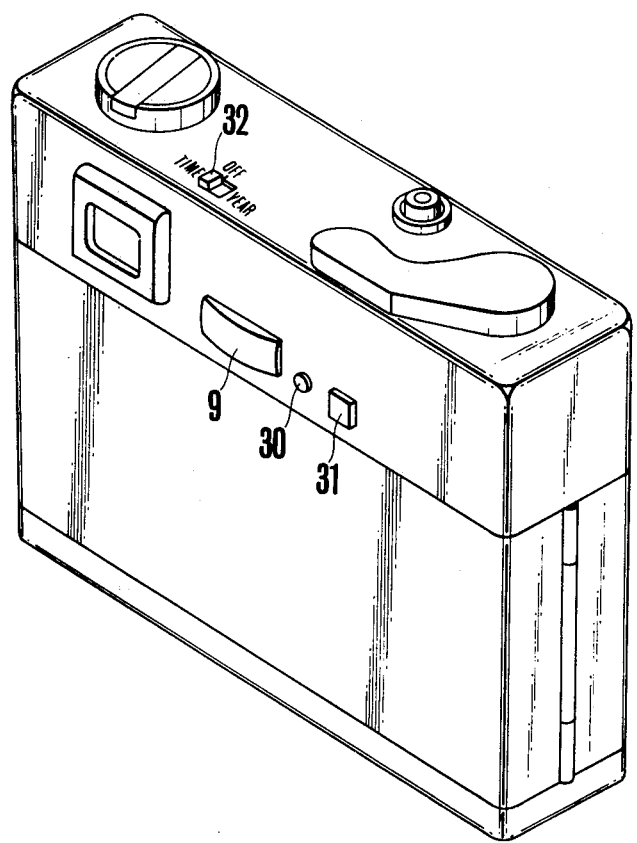
FIG. 25 is a perspective view of a camera employing the printing device of the invention.

FIG. 25 shows an example of arrangement of some parts of the printing device of the invention on the camera housing. Three operating members for the SET switch SW1, READ switch SW2 and TIME/DATE selector switch SW3 are shown at 30, 31 and 32 respectively.

It will be seen from the foregoing that the present invention provides a data recording and printing device for a photographic camera with a digitally operated data source or clock capable not only of producing numbers in second, minute and hour, but also of producing numbers in day, month and year. Since these numbers can be selectively displayed by a single display device at a time or in time-displaced relation, the various sorts of data can be printed on each picture frame, provided that the desired values are set in the electronic clock.

What is claimed is:

1. A camera having a data recording device comprising:
   (a) a watch circuit having a counter circuit for counting pulses, said watch circuit performing a watch operation by counting the pulses;
   (b) illuminating means connected to said watch circuit for displaying the content of said counter circuit; and
   (c) a control circuit for producing a print signal for holding the content of said counter circuit, said print signal being a signal of a shorter pulse width than that of said pulses so that the content of said counter circuit does not change during the printing operation of said data recording device.

2. A camera according to claim 1, further comprising: film sensitivity setting means for setting the sensitivity of a film and a film sensitivity information signal forming circuit for controlling the amount of light produced from said illuminating means in accordance with said film sensitivity setting means.

3. A camera according to claim 1, wherein said counter circuit includes a first group of counter means for counting at least month and date information and a second group of counter means for counting at least hour and minute information, and said camera further comprises selecting operation means for selecting said first or second group of counter means to selectively transmit the content of the first or second group of counter means to the illuminating means.

4. A camera according to claim 1, further comprising: means for producing an exposure termination signal when the exposure operation is finished and said control circuit produces said print signal in response to the exposure operation termination signal.

5. A camera according to claim 4, further comprising: film sensitivity setting means for setting the sensitivity of a film and a film sensitivity information signal forming circuit for controlling the amount of light produced from said illuminating means in accordance with said film sensitivity setting means.

6. A camera according to claim 4, wherein said counter circuit includes a first group of counter means for counting at least month and date information and a second group of counter means for counting at least hour and minute information, and said camera includes selecting operation means for selecting said first or second group of counter means to selectively transmit the content of the first or second group of counter means to the illuminating means.

7. A camera according to claim 1, wherein said illuminating means becomes operative in response to said print signal.

8. A camera according to claim 1, further comprising:
(a) a monitor optical system for guiding light from said illuminating means to the outside of the camera;
(b) a data recording optical system for guiding light from said illuminating means to a film; and
(c) means for guiding light from said illuminating means to said data recording optical system in response to said print signal and for normally light shielding transmission of light from said illuminating means to the data recording optical system.

9. A camera according to claim 1, wherein said counter circuit includes a plurality of counter parts each for counting a different kind of time information, and said camera further includes a time sequence control circuit for sequentially transmitting the content of a given counter part to the illuminating means in response to the print signal.

10. A camera having a data recording device comprising:
(a) a watch circuit having a counter circuit for counting pulses, said watch circuit performing a watch operation by counting the pulses and said counter cricuit having a plurality of counters, each for counting a different kind of time information;
(b) illuminating means connected to said watch circuit for displaying the content of said counter circuit;
(c) a control circuit for producing a print signal for enabling the illuminating operation of said illuminating means to record at least the content of said counter circuit to a film;
(d) a time sequence control circuit for sequentially transmitting the content of a given counter to the illuminating means in response to the print signal; and
(e) an optical system arranged to transfer light coming from said illuminating means to a film surface for recording data thereon, said optical system being arranged to transfer said light from said illuminating means to a position on said film surface in such a manner so that said position differs from a previous position or positions each time the value displayed by said illuminating means varies.

11. A camera having a data recording device comprising:
(a) a watch circuit having a counter circuit for counting pulses, said watch circuit performing a watch operation by counting the pulses;
(b) illuminating means connected to said watch circuit for displaying the content of said counter circuit;
(c) a control circuit for producing a print signal for enabling the illuminating operation of said illuminating means to record at least the content of said counter circuit on a film;
(d) a time sequence control circuit for sequentially producing a transmit signal to sequentially transmit the content of a counter to the illuminating means in response to the print signal; and
(e) optical means arranged to be displaced in response to said transmit signal so that light from said illuminating means is transmitted to different predetermined positions when the display content by the illuminating means is changed.

12. A camera having a data recording device comprising:
(a) a pulse generator for producing a pulse with a certain frequency;
(b) a watch circuit having a counter circuit for counting a pulse from said pulse generator, said watch circuit performing watching operation by counting the pulse;
(c) a printing light source for printing at least the content counted by the counter circuit of said watch circuit;
(d) a timer circuit for producing an output in response to a print signal from the camera, said timer circuit holds the output certain duration of time;
(e) a circuit connected to said timer circuit and input of the watch circuit, whereby said circuit operates to terminate the counting operation of pulse from said pulse generator by said counter circuit of watch circuit in response to the output of timer circuit; and
(f) an illuminating control circuit connected to said printing light source, said control circuit enabling said light source to be operative in response to the output of the timer circuit.

13. A camera according to claim 12, wherein said timer circuit comprises a counter for counting a pulse with a certain frequency, gate means connected to said counter for transmitting the pulse in response to a print signal from a camera, detecting means connected to said couner for detecting the content of counter and for producing an output when the content of counter reaches a predetermined value, and means for producing an output in response to a print signal and for keeping the output until the output from detecting means appears.

14. A camera having a data recording device comprising:
(a) a pulse generator for producing a pulse with a certain frequency;
(b) a watch circuit having a counter circuit for counting a pulse from said pulse generator, said watch circuit performing watching operation by counting the pulse;

(c) a printing light source for printing at least the content counted by the counter circuit of said watch circuit;

(d) a timer circuit for producing an output in response to a print signal from the camera, so that said timer circuit holds the output certain duration of time;

(e) a circuit connected to said timer circuit and the input of the watch circuit, so that said circuit operates to terminate the counting operation of pulse from said pulse generator by said counter circuit of the watch circuit in response to the output of the timer circuit;

(f) a film speed information setting means;

(g) a film information signal forming circuit connected to said film speed information setting means, said signal forming circuit producing a pulse signal in response to the output from said timer circuit, and the duty ratio of said pulse signal is controlled by the film speed set by film speed information setting means; and (h) an illuminating control circuit connected to said printing light source, said control circuit enables said light source to be operative in response to the pulse signal from the film information signal forming circuit.

15. A camera having a data recording device comprising:

(a) a pulse generator for producing a pulse with a certain frequency;

(b) a watch circuit having a counter circuit for counting a pulse from said pulse generator, said watch circuit performing watching operation by counting the pulse;

(c) a light source for printing the content of the counter circuit to the film;

(d) a timer circuit for producing an output in response to a print signal from the camera, so that said timer circuit holds the output of certain duration of time;

(e) gate means connected to said counter circuit, said gate means applying the output from the timer circuit to the input of the counter circuit for holding the content of the counter circuit during the timer circuit operates;

(f) film speed information setting means;

(g) a film speed signal forming circuit operative in response to the output from the timer circuit for producing a pulse with a certain frequency, the frequency of the pulse from said film speed signal forming circuit being controlled in accordance with the value set by said film speed information setting means; and (h) an illuminating control circuit operative in response to the output of said film speed signal forming circuit for controlling the amount of light produced from said light source in accordance with said frequency.

16. A camera according to claim 15, wherein said film speed signal forming circuit has a plurality of gate circuits to which respective pulses are applied at different frequencies to one another and has a selecting circuit for selecting a predetermined one of said gate circuits depending upon the film speed value set in said film speed information setting means.

17. A camera having a data recording device comprising:

(a) a pulse generator for producing a pulse with a certain frequency;

(b) a watch circuit having a counter circuit for counting a pulse from said pulse generator, said watch circuit performing watching operation by counting the pulse;

(c) illuminating means for displaying the content of the counter circuit;

(d) an exposure control circuit for producing an exposure termination signal when the exposure operation is finished;

(e) an operation member for displaying the content of the counter circuit for the operator;

(f) a display signal forming circuit coupled to said operation member for producing an output when the operation member is operated by the operator;

(g) a timer circuit for producing an output in response to said exposure termination signal, so that said timer circuit holds the output of certain duration of time;

(h) gate means connected to said counter circuit, said gate means applying the output from the timer circuit to the input of the counter circuit for holding the content of the counter circuit during the time the timer circuit operates;

(i) film speed information setting means;

(j) a film speed signal forming circuit for producing a pulse with a certain frequency in response to the output from the timer circuit, said signal forming circuit producing a pulse with a frequency based on the value of film speed set in said film speed information setting means;

(k) an illumination control circuit connected to said illuminating means, said circuit responsive to the output of said display signal forming circuit for causing said illuminating means to produce light and responsive to the pulse from said film speed signal forming circuit for causing said illuminating means to be lighted at the frequency of said pulse.

18. A camera having a data recording device comprising:

(a) a watch circuit having a counter circuit for counting a pulse, said watch circuit performing watching operation by counting the pulse, and said counter circuit including at least a first counter for measuring time for first data and a second counter for measuring time for second data;

(b) illuminating means for displaying the content of the counter circuit;

(c) a timer circuit for producing an output in response to said exposure termination signal, so that said timer circuit holds the output a certain duration of time;

(d) an operation member for displaying the content of the counter circuit for the operator;

(e) a timing circuit responsive to said timer circuit for producing a first signal during a predetermined time, for producing a second signal after the lapse of that time, and for producing a third signal after the second signal;

(f) a first transmission circuit responsive to said first signal for transmitting the content of said first counter to the illuminating means, whereby the content of said first counter is displayed;

(g) a second transmission circuit responsive to said third signal for transmitting the content of said second counter to the illuminating means, whereby the content of said second counter is displayed;

(h) data printing optical means arranged to be displaced in response to said second signal so that light from said illuminating means is deflected to a predetermined position of a film;

whereby the content of at least the first counter is printed to the film surface by the first signal, then said data printing optical means is displaced by said second signal, and then the content of the second counter is printed by said third signal to the film surface in a position different from that in which the content of the first counter is printed by the first signal.

19. A camera having a data recording device comprising:
    (a) a watch circuit having a counter circuit for counting pulses, said watch circuit performing a watch operation by counting pulses;
    (b) illuminating means connected to said watch circuit for displaying the content of said counter circuit;
    (c) print signal forming means for forming a print signal;
    (d) a display optical system for guiding light coming from said illuminating means to the outside of the camera;
    (e) a printing optical system for guiding the light from said illuminating means to a film surface in response to said print signal; and
    (f) a control circuit for controlling the quantity of illuminating light of said illuminating means to keep it at a predetermined quantity irrespective of the sensitivity of film employed at the time of display and for controlling the quantity of said illuminating light according to the film sensitivity in response to said print signal.

20. A camera having a data recording device comprising:
    (a) a watch circuit having a counter circuit for counting pulses, said watch circuit performing a watch operation by counting pulses;
    (b) a printing light source for printing the content of the counter circuit of said watch circuit;
    (c) print signal forming means for forming a print signal; and
    (d) a light emission quantity control circuit which is arranged to form a pulse signal in response to said print signal, said printing light source being arranged to have the quantity of light emission thereby controlled in accordance with the duty of said pulse signal, said duty of said pulse signal being determined in accordance with the sensitivity of film employed.

21. A camera having a data recording device comprising:
    (a) a watch circuit having a counter circuit for counting pulses, said watch circuit performing a watch operation by counting pulses;
    (b) illuminating means connected to said watch circuit for displaying the content of said counter circuit;
    (c) a print signal forming circuit for forming a print signal; and
    (d) a control circuit connected to said watch circuit, said control circuit being arranged to produce a pulse in response to the print signal, said counter circuit of said watch circuit being arranged to have the counting action stopped by said pulse for a predetermined period of time.

* * * * *